(12) United States Patent
Xiong et al.

(10) Patent No.: US 12,040,496 B1
(45) Date of Patent: Jul. 16, 2024

(54) CURRENT COLLECTING COMPONENT, ENERGY STORAGE DEVICE AND POWER CONSUMING DEVICE

(71) Applicants: Shenzhen Hithium Energy Storage Technology Co., Ltd., Guangdong (CN); Xiamen Hithium Energy Storage Technology Co., Ltd., Fujian (CN)

(72) Inventors: Yongfeng Xiong, Guangdong (CN); Jinqiang Chen, Guangdong (CN)

(73) Assignees: Shenzhen Hithium Energy Storage Technology Co., Ltd., Guangdong (CN); Xiamen Hithium Energy Storage Technology Co., Ltd., Fujian (CN)

( * ) Notice: Subject to any disclaimer, the term of this patent is extended or adjusted under 35 U.S.C. 154(b) by 0 days.

(21) Appl. No.: 18/395,016

(22) Filed: Dec. 22, 2023

(30) Foreign Application Priority Data

Feb. 9, 2023 (CN) .......................... 202310091046.8

(51) Int. Cl.
| | |
|---|---|
| *H01M 4/75* | (2006.01) |
| *H01M 4/66* | (2006.01) |
| *H01M 50/103* | (2021.01) |
| *H01M 50/531* | (2021.01) |

(52) U.S. Cl.
CPC ............. *H01M 4/75* (2013.01); *H01M 4/661* (2013.01); *H01M 50/103* (2021.01); *H01M 50/531* (2021.01); *H01M 2220/20* (2013.01); *H01M 2220/30* (2013.01)

(58) Field of Classification Search
None
See application file for complete search history.

(56) References Cited

FOREIGN PATENT DOCUMENTS

| CN | 205069738 U | 3/2016 |
|---|---|---|
| CN | 107204419 A | 9/2017 |
| CN | 209747632 U | 12/2019 |
| CN | 112787047 A | 5/2021 |
| CN | 213583958 U | 6/2021 |
| CN | 213583959 U | 6/2021 |

(Continued)

OTHER PUBLICATIONS

WIPO, International Search Report and Written Opinion for International Patent Application No. PCT/CN2023075259, Oct. 11, 2023, 15 pages.

(Continued)

*Primary Examiner* — Jonathan G Leong
*Assistant Examiner* — Tony S Chuo
(74) *Attorney, Agent, or Firm* — IP Spring

(57) ABSTRACT

The present disclosure provides a current collecting component, an energy storage device and a power consuming device. The current collecting component includes a connector and an insulating member. The connector includes a first connecting part, a second connecting part, and a bendable connecting part. The bendable connecting part defines a through hole to form a first fusing part and a second fusing part. The insulating member is located between the first connecting part and the second connecting part. When the connector is in an unfolded state, the through hole has a first straight line segment, a first corner segment, a second corner segment and a second straight line segment. The first corner segment and the second corner segment are both set as rounded corners.

20 Claims, 13 Drawing Sheets

(56) References Cited

FOREIGN PATENT DOCUMENTS

| | | | |
|---|---|---|---|
| CN | 214672771 | U | 11/2021 |
| CN | 215527892 | U | 1/2022 |
| CN | 216958265 | U | 7/2022 |
| CN | 217062304 | U | 7/2022 |
| CN | 217062421 | U | 7/2022 |
| CN | 217239677 | U | 8/2022 |
| CN | 217589341 | U | 10/2022 |
| CN | 217589363 | U | 10/2022 |
| CN | 217719890 | U | 11/2022 |
| CN | 115588822 | A | 1/2023 |
| WO | 2018090177 | A1 | 5/2018 |
| WO | 2022160494 | A1 | 8/2022 |

OTHER PUBLICATIONS

CNIPA, First Office Action for corresponding Chinese Patent Application No. 202310091046.8, Apr. 5, 2023, 24 pages.
CNIPA, Notification to Grant Patent Right for Invention for corresponding Chinese Patent Application No. 202310091046.8, Apr. 21, 2023, 10 pages.

CURRENT COLLECTING COMPONENT, ENERGY STORAGE DEVICE AND POWER CONSUMING DEVICE

CROSS-REFERENCE TO RELATED APPLICATIONS

This application claims priority under 35 U.S.C. § 119(a) to Chinese Patent Application No. 202310091046.8, filed Feb. 9, 2023, the entire disclosure of which is incorporated herein by reference.

TECHNICAL FIELD

The present disclosure relates to a technical field of energy storage technology, and in particular to a current collecting component, an energy storage device and a power consuming device.

BACKGROUND

With increasing development of power consuming devices, there is a high demand for the performance of the energy storage batteries that provide energy for them. Energy storage batteries have been widely used due to their advantages of high energy density, high operating voltage and long service life.

A pole of an energy storage battery can be electrically connected to a tab through a connector, to make full use of an internal space of the energy storage battery and improve an assembly quality of a power battery.

SUMMARY

In view of this, the present disclosure provides a current collecting component, an energy storage device and a power consuming device.

In a first aspect, embodiments of the present disclosure provide a current collecting component including a connector and an insulating member. The connector includes a first connecting part, a second connecting part, and a bendable connecting part connecting the first connecting part and the second connecting part. The first connecting part is located opposite to the second connecting part. The insulating member is located between the first connecting part and the second connecting part which can be bent relative to each other. The bendable connecting part defines a through hole to form a first fusing part and a second fusing part connecting the first connecting part and the second connecting part at a portion of the bendable connecting part located on opposite sides of the through hole. When the connector is in an unfolded state, the through hole has a first straight line segment, a first corner segment, a second corner segment and a second straight line segment. The first straight line segment is connected to the first corner segment and adjacent to the first fusing part. The second straight line segment is connected to the second corner segment and adjacent to the second fusing part. The first corner segment and the second corner segment are both set as rounded corners. A distance between the first straight line segment and one side of the first fusing part away from the first straight line segment is a first distance. A distance between one end of the first corner segment away from the first straight line segment and the side of the first fusing part away from the first corner segment is a second distance. The first distance is less than the second distance. A distance between the second straight line segment and one side of the second fusing part away from the second straight line segment is a third distance. A distance between one end of the second corner segment away from the second straight line segment and the side of the second fusing part away from the second corner segment is a fourth distance. The third distance is less than the fourth distance.

With the current collecting component provided in the embodiments of the present disclosure, in a first aspect, the through hole is defined in the bendable connecting part. Therefore, a large current generated by the energy storage device when it is out of control can act on the first fusing part and the second fusing part to fuse the first fusing part and the second fusing part, so that an open circuit state is formed between the first connecting part and the second connecting part, no voltage is output, and the energy storage device is protected from explosion and fire. Furthermore, the insulating member can increase an insulation of the first connecting part and second connecting part on both sides of the first fusing part and the second fusing part, thereby further increasing an arc extinguishing effect. In a second aspect, the first corner segment and the second corner segment of the through hole are both set as rounded corners, thereby avoiding the connector from scratching tab, and improving a production yield. In a third aspect, the distance between the first straight line segment and the side of the first fusing part away from the first straight line segment is smaller than the distance between the end of the first corner segment away from the first straight line segment and the side of first fusing part away from the first straight line segment, and the distance between the second straight line segment and the side of the second fusing part away from the second straight line segment is smaller than the distance between the end of the second corner segment away from the second straight line segment and the side of the second fusing part away from the second corner segment, which makes a fusing position of the connector more closer to a mechanical fatigue region of the bendable connecting part, thereby making a fusing effect being more likely formed and improving a safety of the energy storage device.

In a second aspect, embodiments of the present disclosure provide an energy storage device including a tab, a pole and a current collecting component as described above. The first connecting part of the current collecting component is electrically connected to the pole; and the second connecting part of the current collecting component is electrically connected to the tab, avoiding thermal runaway of the energy storage device and enhancing the safety of the energy storage device.

In a third aspect, embodiments of the present disclosure provide a power consuming device including an energy storage device as described above. The energy storage device provides electrical energy for the power consuming device, enhancing the safety of the power consuming device.

BRIEF DESCRIPTION OF THE ACCOMPANYING DRAWINGS

In order to more clearly illustrate the technical solutions in the embodiments or related art of the present disclosure, the accompanying drawings to be used in the description of the embodiments or related art will be briefly introduced below. The accompanying drawings in the following description are only some of the embodiments of the present disclosure, for a person of ordinary skill in the art, other accompanying drawings may be available according to the accompanying drawings.

Figure 1:
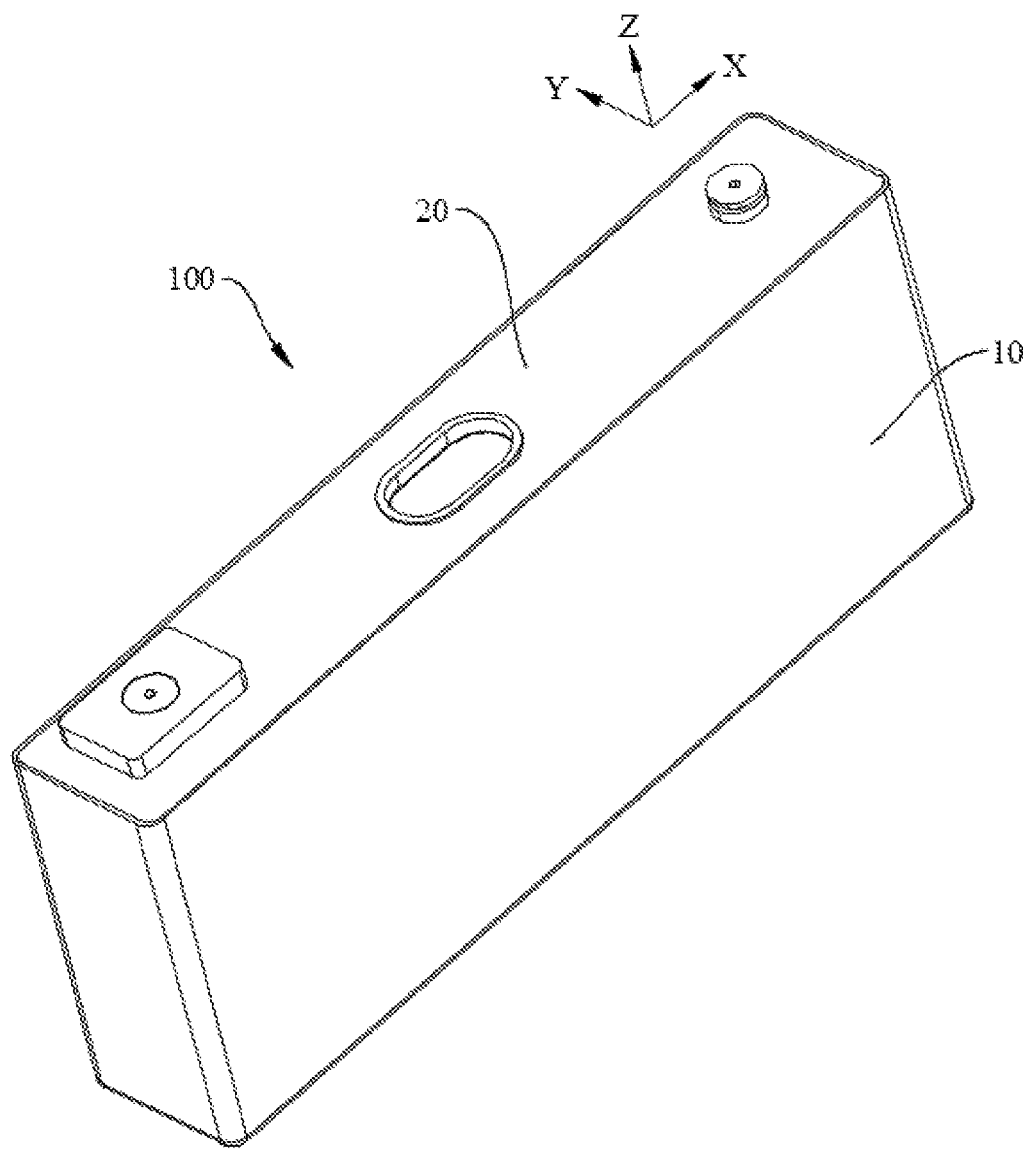
FIG. 1 is a structural schematic view of an energy storage device in accordance with one embodiment of the present disclosure.

The description of reference signs:

Energy storage device 100; housing 10; opening 101; receiving space 102; end cap assembly 20; cover plate 201; pole 202; electrode assembly 30; battery cell 301; tab 302; first connecting segment 3021; second connecting segment 3022; third connecting segment 3023; current collecting component 40; lower plastic member 50; limiting groove 501; limiting protrusion 502; connector 1; first folding axis P1; second folding axis P2; connector main body 110; gap 120; curved structure 130; first connecting part 11; first soldering region 111; first non-soldering region 112; second connecting part 13; second soldering region 131; second non-soldering region 132; first connecting piece 133; second connecting piece 134; insertion space 135; bendable connecting part 15; through hole 150; first straight line segment 1501; first corner segment 1502; second corner segment 1503; second straight line segment 1504; third straight line segment 1505; fourth straight line segment 1506; first distance D1; second distance D2; third distance D3; fourth distance D4; fifth distance D5; sixth distance D6; seventh distance D7; first length L1; second length L2; first fusing part 151; second fusing part 152; fusing direction F11; fusing direction F12; bending direction F2; insulating member 3; limiting surface 310; limiting body 31; window 311; receiving groove 312; movable flap 33; notch 330; fixed part 331; extending portion 332; thickness H; thickness T; length C1; length C2; length C3; length C4; width W1; width W2; first insulating film 5; second insulating film 6; first membrane body 61; second membrane body 62.

The following specific embodiments will further illustrate the present disclosure with reference to the above-described accompanying drawings.

DETAILED DESCRIPTION OF ILLUSTRATED EMBODIMENTS

The technical solutions in the embodiments of the present disclosure will be described clearly in the following with reference to the accompanying drawings in the embodiments of the present disclosure. The described embodiments are only a part of the embodiments of the present disclosure and not all of the embodiments. Based on the embodiments in the present disclosure, other embodiments obtained by a person of ordinary skill in the art shall fall within the protection scope of the present disclosure.

It should be understood that the terms in the specification and claims of the present disclosure and the above-described accompanying drawings are intended to describe particular embodiments and are not intended to limit the present disclosure. The terms "first", "second", and so on in the specification and claims of the present disclosure and the above-described accompanying drawings are configured to distinguish between different objects and are not intended to describe a particular order. The singular forms "one" and "the" are also intended to include a plural form unless the context clearly indicates otherwise. The term "include", and any variations thereof, is intended to cover non-exclusive inclusion. In addition, the present disclosure may be implemented in many different forms and is not limited to the embodiments described herein. The following specific embodiments are provided for the purpose of facilitating a clearer and more thorough understanding of the disclosure of the present disclosure, the terms indicating orientation such as up, down, left, right, and so on are only for the position of the shown structure in the corresponding accompanying drawings. In the description of the present disclosure, it should be noted that, unless otherwise expressly specified and limited, the terms "mounted", "connected", "coupled", "located on . . . " are to be understood in a broad sense, e.g., either fixedly coupled, detachably coupled or integrally coupled; mechanically coupled; directly coupled or indirectly coupled through an intermediary medium, or connected internally within the two elements. For those of ordinary skill in the art, the specific meaning of the above terms in the present disclosure may be understood in specific cases.

The specification hereinafter describes preferred embodiments for implementing the present disclosure; however, the foregoing description is for the purpose of illustrating the general principles of the present disclosure and is not intended to limit the scope of the present disclosure. The protection scope of the present disclosure shall be as defined in the appended claims.

The following is a brief introduction of the basic concepts involved in the embodiments of the present disclosure.

The term "energy storage device" means a device that converts stored chemical energy into electrical energy, i.e., a device that converts pre-stored energy into electrical energy for external use.

The term "fuel cell" means a chemical device that directly converts the chemical energy of fuel into electrical energy, also known as an electrochemical generator.

The term "power battery" refers to a power source that provides power for a tool, and mostly refers to a storage battery that provides power for an electric car, an electric train, an electric bicycle, a golf cart, etc.

Figure 16:
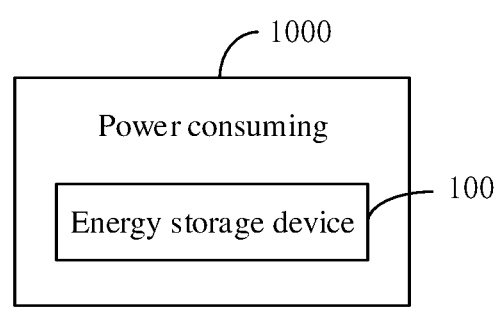
FIG. 16 is a block diagram of a power consuming device.

The power consuming device of the embodiments of the present disclosure includes, but is not limited to, a portable device such as a Bluetooth headset, a mobile phone, a digital phone, a tablet computer, and so on, and a large-scale device such as an electric motorbike, an electric vehicle, an energy storage power station, and so on. The embodiments of the present disclosure are not limited. Referring to FIG. 16, the power consuming device 1000 includes at least one energy storage device 100. The energy storage device 100 provides electrical energy for the power consuming device 1000. The energy storage device 100 includes, but is not limited to, at least one of a power battery, a fuel cell, a super capacitor, and so on. The power battery includes, but is not limited to, a lithium ion power battery, a nickel metal hydride power battery, a supercapacitor, and so on.

Figure 2:
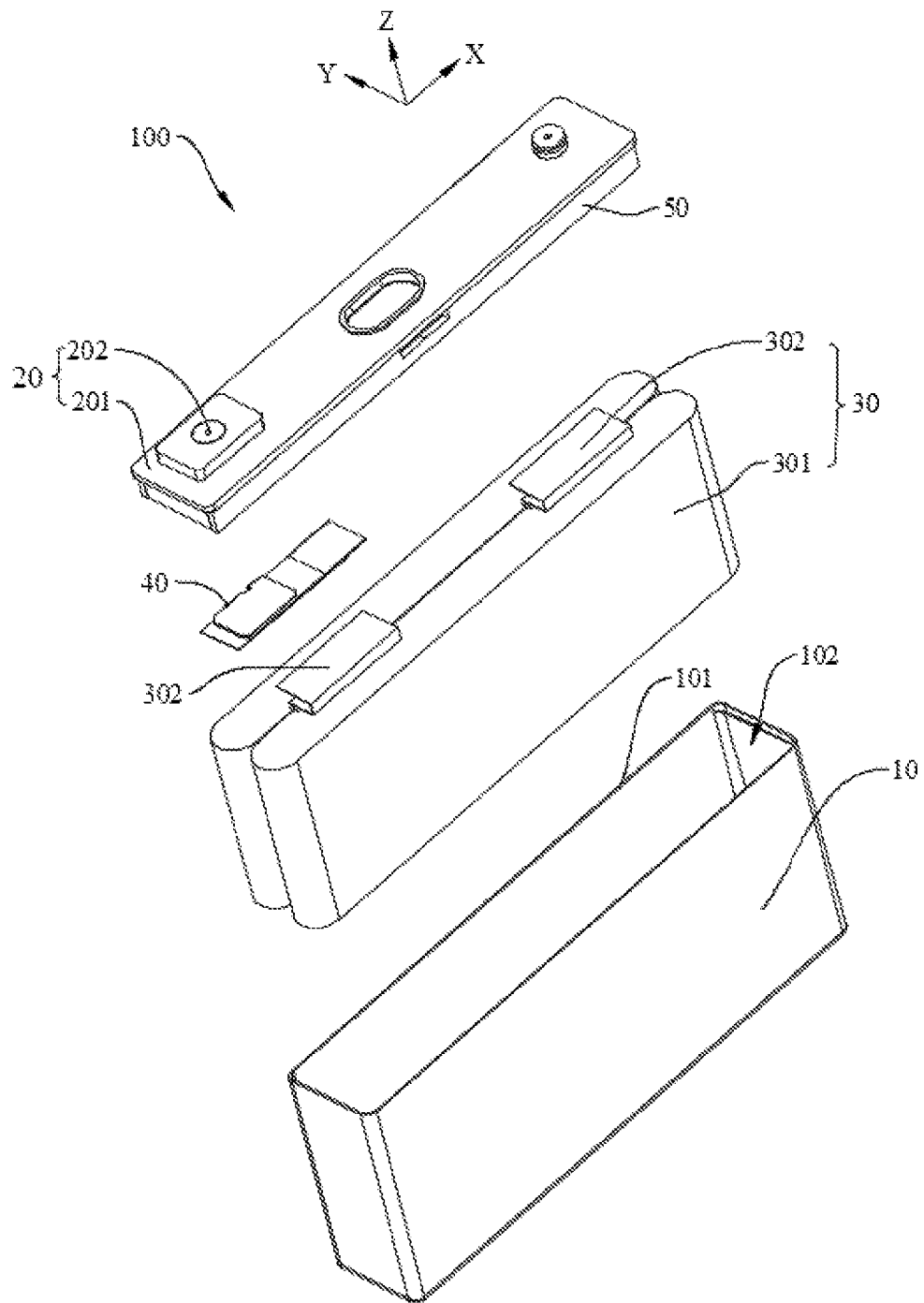
FIG. 2 is an exploded view of the energy storage device of FIG. 1 in a first view.
Figure 3:
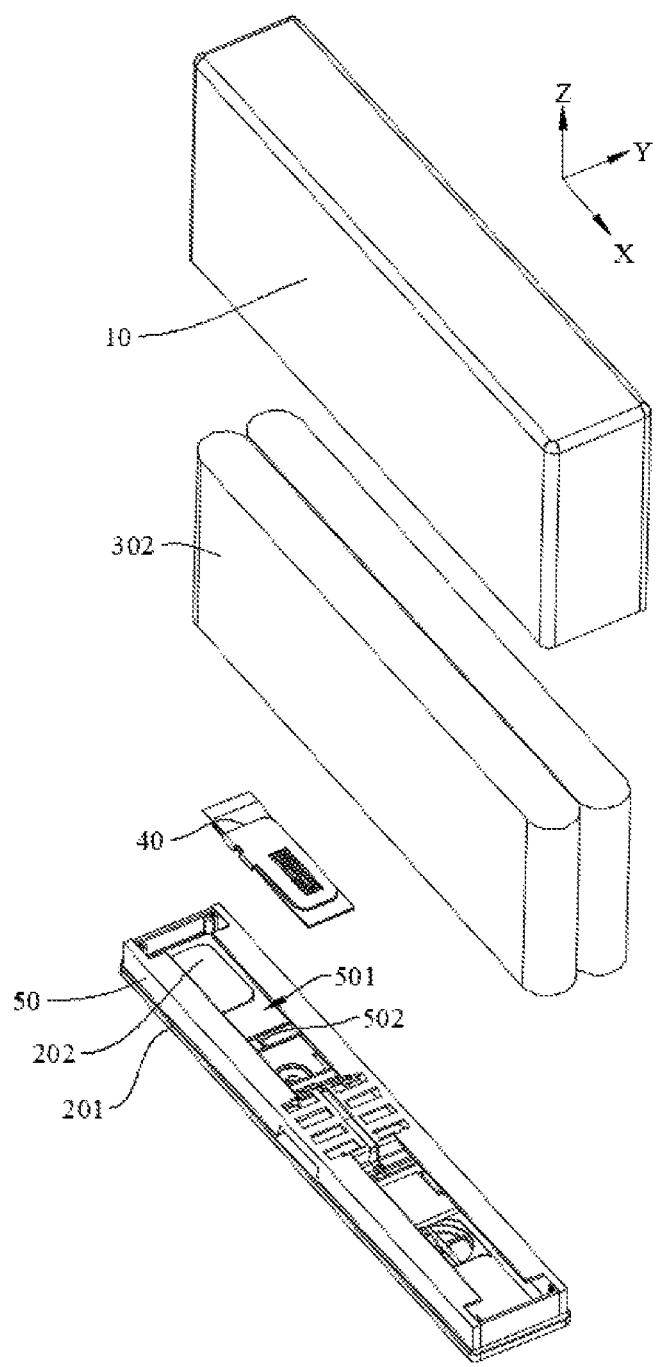
FIG. 3 is an exploded view of the energy storage device of FIG. 2 in a second view.

It should be understood that in order to enable a person skilled in the art to better understand the energy storage device, the energy storage device is illustrated in detail using a power battery as an example. It should be noted that the energy storage device which is a power battery is only configured to illustrate, and the present disclosure does not make specific limitations, for example, the product type of the energy storage device can also be set according to the actual needs. Referring to FIGS. 1 to 3, FIG. 1 is a structural schematic view of an energy storage device 100 in accordance with one embodiment of the present disclosure; FIG. 2 is an exploded view of the energy storage device 100 of FIG. 1 in a first view; and FIG. 3 is an exploded view of the energy storage device 100 of FIG. 2 in a second view. The energy storage device 100 includes a housing 10, an end cap assembly 20, an electrode assembly 30 and a current collecting component 40. The electrode assembly 30 and the current collecting component 40 are located in the housing 10. The housing 10 is hermetically sealed and fixedly connected to the end cap assembly 20 to achieve encapsulation of the electrode assembly 30 and the current collecting component 40. Specifically, the housing 10 defines an opening 101 and a receiving space 102 interconnected to the opening 101. The electrode assembly 30 is received in the receiving space 102. The receiving space 102 is also used for storing the electrolyte to enable the electrolyte to infiltrate the electrode assembly 30. The end cap assembly 20 includes a cover plate 201 and two poles 202 located on the cover plate 201. The electrode assembly 30 includes at least one battery cell 301 and at least one tab 302 electrically connected to the battery cell 301. The pole 202 is electrically connected to the tab 302 through the current collecting component 40. The number of the battery cells 301 may be one or more. For example, in this embodiment, the electrode assembly 30 includes two battery cells 301 located side by side along a width direction of the energy storage device 100. It should be noted that the number of the battery cells 301 is merely for illustration and does not constitute a specific limitation. The number of the battery cells 301 needs to be designed according to the actual product design.

In some embodiments, the energy storage device 100 further includes a lower plastic member 50 connected to the end cap assembly 20. Specifically, the lower plastic member 50 is fixedly connected to one side of the cover plate 201 near the housing 10. The lower plastic member 50 defines a limiting groove 501 for positioning the current collecting component 40. A bottom of the limiting groove 501 is provided with a limiting protrusion 502 for contacting the second connecting part 13, so as to make an assembling process of the current collecting component 40 uniformly stressed, reliably positioned, and to improve the assembling efficiency and accuracy.

It should be noted that the purpose of FIG. 1 is only to schematically depict an example of the housing 10, the end cap assembly 20, the electrode assembly 30, the current collecting component 40 and the lower plastic member 50, and is not to make a specific limitation on the connection position, the connection relationship, the specific structure and so on of each component. FIG. 1 is only a structure of the energy storage device 100 illustrated in an embodiment of the present disclosure, and does not constitute a specific limitation of the energy storage device 100. In other embodiments of the present disclosure, the energy storage device 100 may include more or fewer components than shown in FIG. 1, or a combination of certain components, or different components; for example, the energy storage device 100 may also include, but is not limited to, a temperature sensor, a battery management system, a connecting harness, and so on.

Figure 4:
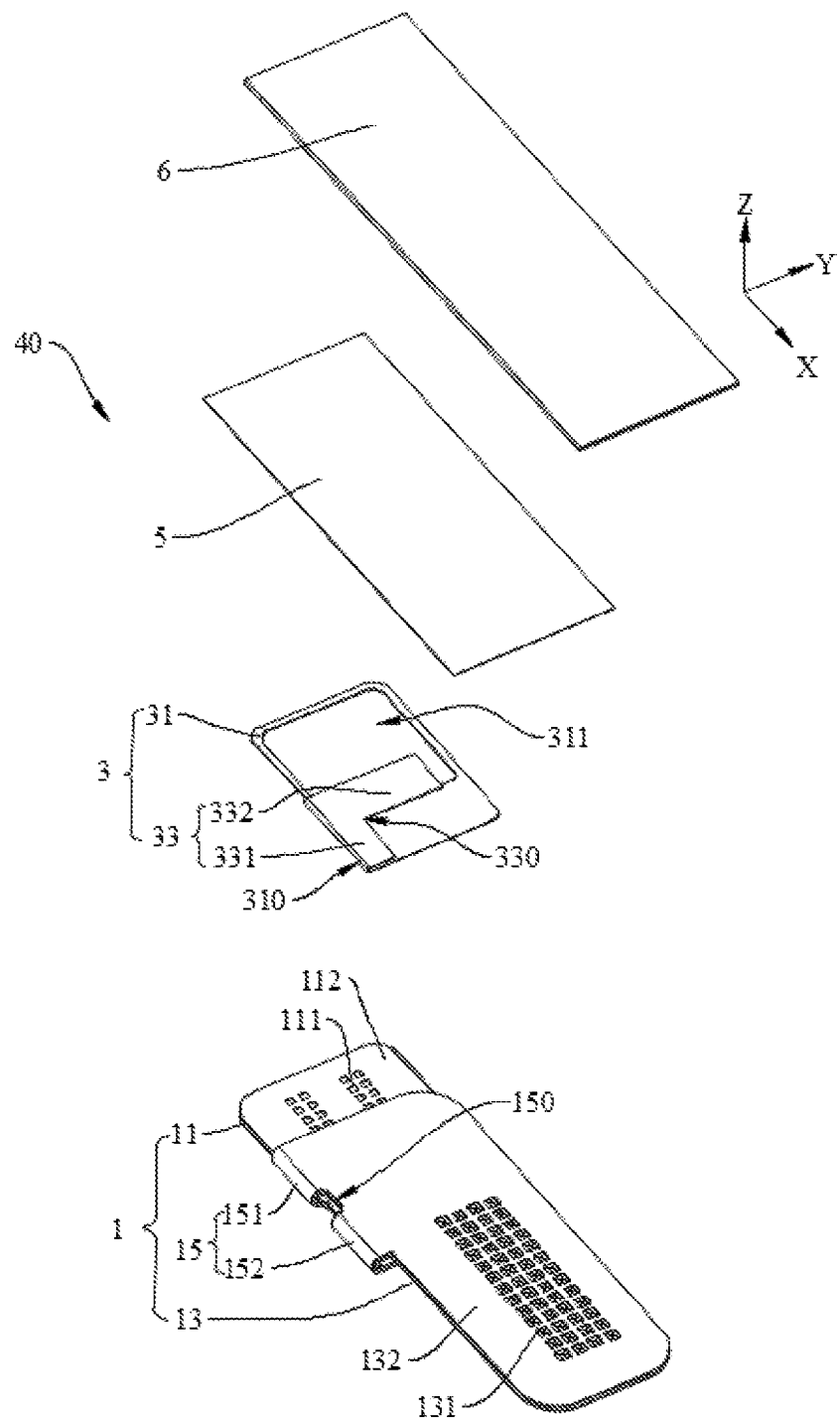
FIG. 4 is an exploded view of a current collecting component of the energy storage device of FIG. 3 in the first view.
Figure 5:
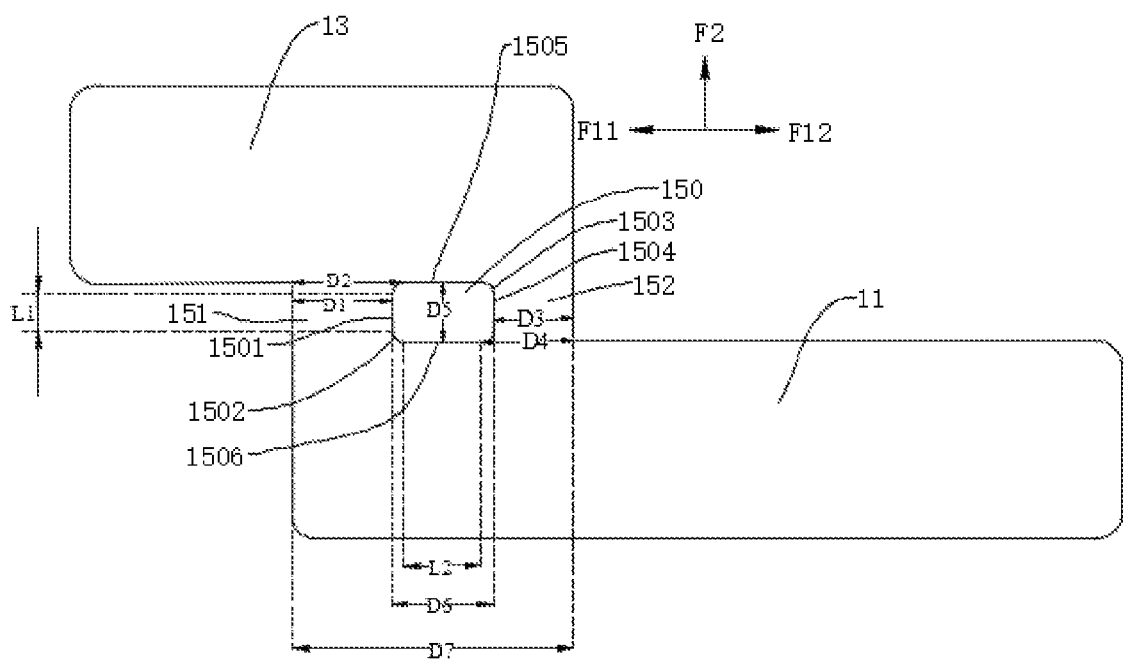
FIG. 5 is an unfolded schematic view of a connector of the current collecting component of FIG. 4.

Referring to FIGS. 2, 4, and 5 together, FIG. 4 is an exploded view of a current collecting component 40 of the energy storage device 100 of FIG. 3 in the first view; and FIG. 5 is an unfolded schematic view of a connector 1 of the current collecting component 40 of FIG. 4. The current collecting component 40 includes a connector 1 and an insulating member 3. The connector 1 includes a first connecting part 11, a second connecting part 13, and a bendable connecting part 15 connecting the first connecting part 11 and the second connecting part 13. The first connecting part 11 is located opposite to the second connecting part 13. The insulating member 3 is located between the first connecting part 11 and the second connecting part 13 which can be bent relative to each other. The bendable connecting part 15 defines a through hole 150, to form a first fusing part 151 and a second fusing part 152 connecting the first connecting part 11 and the second connecting part 13 at a portion of the bendable connecting part 15 located on opposite sides of the through hole 150. When the connector 1 is in an unfolded state, the through hole 150 has a first straight line segment 1501, a first corner segment 1502, a second corner segment 1503, and a second straight line segment 1504. The first straight line segment 1501 is connected to the first corner segment 1502 and is adjacent to first fusing part 151. The second straight line segment 1504 is connected to the second corner segment 1503 and is adjacent to the second fusing part 152. The first corner segment 1502 and the second corner segment 1503 are both set as rounded corners. A distance between the first straight line segment 1501 and one side of the first fusing part 151 away from the first straight line segment 1501 is a first distance D1. A distance between one end of the first corner segment 1502 away from the first straight line segment 1501 and the side of the first fusing part 151 away from the first corner segment 1502 is a second distance D2. The first distance D1 is less than the second distance D2. A distance between the second straight line segment 1504 and one side of the second fusing part 152 away from second straight line segment 1504 is a third distance D3. A distance between one end of the second corner segment 1503 away from the second straight line segment 1504 and the side of the second fusing part 152 away from the second corner segment 1503 is a fourth distance D4. The third distance D3 is less than the fourth distance D4.

It should be noted that, for the convenience of illustrating the technical solution of the present disclosure, referring to FIG. 5, the connector 1 being in the unfolded state refers to a state in which the bendable connecting part 15 of the connector 1 is not bent, at which time the first connecting part 11, the second connecting part 13 and the bendable connecting part 15 are set on a common surface. The fact that the connector 1 is in the unfolded state is only for the purpose of the accuracy of describing the through hole 150, and is not a usage state of the product of the energy storage device 100. In the usage state, the bendable connecting part 15 of the connector 1 is bent and the first connecting part 11 is located opposite to the second connecting part 13.

It should be noted that, the existing energy storage battery generates a huge current when short circuited, which generates a large amount of heat, and may cause a fire and explosion of the energy storage battery, resulting in safety accidents. In the present disclosure, with the current collecting component 40 provided in the embodiments of the present disclosure, in a first aspect, a through hole 150 is defined in the bendable connecting part 15; therefore, a huge current generated by the energy storage device 100 when it is out of control can act on the first fusing part 151 and the second fusing part 152 to fuse the first fusing part 151 and the second fusing part 152, so that an open circuit state is formed between the first connecting part 11 and the second connecting part 13 and no voltage is output, so as to play a protective role on the energy storage device 100, without producing an explosion, fire phenomenon. Furthermore, the insulating member 3 can increase an insulation of the first connecting part 11 and the second connecting part 13 on both sides of the first fusing part 151 and the second fusing part 152, thus further increasing an arc extinguishing effect. In a second aspect, the first corner segment 1502 and the second corner segment 1503 of the through hole 150 are both set as rounded corners, thereby avoiding the connector 1 from scratching tab 302, to improve a production yield. In a third aspect, the distance between the first straight line segment 1501 and the side of the first fusing part 151 away from the first straight line segment 1501 is smaller than the distance between the end of the first corner segment 1502 away from the first straight line segment 1501 and the side of the first fusing part 151 away from the first straight line segment 1501, and the distance between the second straight line segment 1504 and the side of the second fusing part 152 away from the second straight line segment 1504 is smaller than the distance between the end of the second corner segment 1503 away from the second straight line segment 1504 and the side of the second fusing part 152 away from the second corner segment 1503, which makes a fusing position of the connector 1 closer to a mechanical fatigue region of the bendable connecting part 15, thereby making a fusing effect being more likely formed and improving a safety of the energy storage device 100.

In some embodiments, the corners of the first connecting part 11, the second connecting part 13, and the bendable connecting part 15 are both set as rounded corners, thereby further avoiding a problem of the connector 1 from causing damage to the tab 302. In this embodiment, the through hole 150 is a square hole, such as a square hole or a rectangular hole. Optionally, exemplarily, in this embodiment, the rectangular hole is a rectangular hole with ellipses. In some other embodiments, the through hole 150 may also be a diamond shaped hole, a rectangular hole, a polygonal hole, an elliptical hole, a waist shaped hole, a circular hole, etc., without specific limitation in the present disclosure.

Optionally, in some embodiments, a fusing direction F11 of the first fusing part 151 and a fusing direction F12 of the second fusing part 152 are both perpendicular to a bending direction F2 of the bendable connecting part 15, thereby ensuring that fusing of the first fusing part 151 and fusing of the second fusing part 152 are easier to form, as well as facilitating bending of the connector 1. It should be noted that the fusing direction F11 of the first fusing part 151 and the fusing direction F12 of the second fusing part 152 refer to a direction perpendicular to a current direction of the connector 1; the fusing direction F11 of the first fusing part 151 refer to a direction from the first straight line segment 1501 to the side of the first fusing part 151 away from the first straight line segment 1501, and the fusing direction F12 of the second fusing part 152 refer to a direction from the second straight line segment 1504 to the side of the second fusing part 152 away from the second straight line segment 1504. The current direction of the connector 1 is parallel to the bending direction F2 of the bendable connecting part 15.

The ratio of the first distance D1 to the second distance D2 may be 0.7 to 0.95, and the ratio of the third distance D3 to the fourth distance D4 may be 0.7 to 0.95, thereby ensuring the fusing reliability of the first fusing part 151 and the second fusing part 152, and as well as ensuring the connector 1 has the characteristics of high strength and not easy to break. For example, the ratio of the first distance D1 to the second distance D2 and the ratio of the third distance D3 to the fourth distance D4 may be 0.7, 0.73, 0.75, 0.77, 0.8, 0.85, 0.88, 0.9, 0.93, or 0.95, and so on. For example, in this embodiment, the first distance D1 is 7 mm, the second distance D2 is 8 mm, and the ratio of the first distance D1 to the second distance D2 is 0.88.

The number of the first corner segments 1502 and the second corner segments 1503 each is two; the two first corner segments 1502 are connected to opposite ends of the first straight line segment 1501; and two second corner segment 1503 are connected to opposite ends of second straight line segment 1504. The through hole 150 further includes a third straight line segment 1505 connected to one first corner segment 1502 and one second corner segment 1503, and a fourth straight line segment 1506 connected to the other first corner segment 1502 and the other second corner segment 1503. The first straight line segment 1501, the two first corner segments 1502, the two second corner segments 1503, the second straight line segment 1504, the third straight line segment 1505, and the fourth straight line segment 1506 together form the through hole 150. As a result, a punching and cutting die to product the through hole 150 has a simple structure, and opening or closing the die is more convenient, and at the same time, the length of the bend required for the bendable connecting part 15 is reduced by defining the through hole 150, which is more favourable for bending and forming.

The lengths of the first straight line segment 1501 and the second straight line segment 1504 are equal and are first length L1. A distance between the third straight line segment 1505 and the fourth straight line segment 1506 is a fifth distance D5. A ratio of the first length L1 to the fifth distance D5 may be 3/7 to 9/10, thereby ensuring that the mechanical fatigue zone of the bendable connecting part 15 is highly coincident with locations where the first fusing part 151 and the second fusing part 152 are formed, and thus the fusing of the first fusing part 151 and the fusing of the second fusing part 152 are more likely to occur. For example, the ratio of the first length L1 to the fifth distance D5 may be, but is not limited to, 0.4, 0.5, 0.6, 0.7, 0.8, or 0.9, and so on.

In some embodiments, the lengths of the third straight line segment 1505 and the fourth straight line segment 1506 are equal and are second length L2. A distance between the first straight line segment 1501 and the second straight line segment 1504 is a sixth distance D6. A ratio of the second length L2 to the sixth distance D6 may be 0.4 to 0.9, thereby ensuring a fusing reliability of the first fusing part 151 and the second fusing part 152, and as well as ensuring that the connector 1 has the characteristics of high strength and not easy to break. For example, the ratio of the second length L2 to the sixth distance D6 may be, but is not limited to, 0.4, 0.5, 0.6, 0.7, 0.8, or 0.9, and so on.

The first corner segment 1502 and the second corner segment 1503 both have a fillet radius of 0.5 mm to 1.5 mm to avoid a problem of the first fusing part 151 and the second fusing part 152 breaking during a bending process. For example, in some embodiments, the first corner segment 1502 and the second corner segment 1503 have a rounded corner radius of 0.5 mm, 1.0 mm, 1.5 mm, and so on. It should be noted that the rounded corner radii of the first corner segment 1502 and the second corner segment 1503 are merely for illustration and do not constitute a specific limitation, and the rounded corner radii of the first corner segment 1502 and the second corner segment 1503 need to be designed according to the actual product design.

In some embodiments, a distance between the side of the first fusing part 151 away from the first straight line segment 1501 and the side of the second fusing part 152 away from the second straight line segment 1504 is a seventh distance D7. A ratio of the sixth distance D6 to the seventh distance D7 may be 0.15 to 0.25, thus ensuring that fusing of the first fusing part 151 and fusing of the second fusing part 152 are more likely to occur, as well as avoiding a phenomenon of stress fatigue or even fracture of the first fusing part 151 and the second fusing part 152 of the connector 1 in the bending process, which improves a usage reliability of the connector 1. For example, the ratio of the sixth distance D6 to the seventh distance D7 may be, but is not limited to, 0.15, 0.2, or 0.25, and so on. For example, in this embodiment, the sixth distance D6 is 3 mm and the seventh distance D7 is 18 mm, and the ratio of the sixth distance D6 to the seventh distance D7 is 0.17.

In some embodiments, the sixth distance D6 of the through hole 150 gradually decreases from a middle of the through hole 150 to two sides of the through hole 150 in a current direction of the connector 1 (i.e., the direction from the third straight line segment 1505 to the fourth straight line segment 1506), thereby ensuring that the first fusing part 151 and the second fusing part 152 can be fused in the middle of the through hole 150, and at the same time ensuring that the connection strength of the two sides of the first fusing part 151 and the second fusing part 152 connected with the first connecting part 11 and second connecting part 13, to further avoid a problem of fracture of the connector 1 during the turning and bending process.

Optionally, in this embodiment, the first connecting part 11, the insulating member 3 and the second connecting part 13 are stacked in a thickness direction of the current collecting component 40. As a result, the overall structure of the current collecting component 40 is made more compact and space-saving; also, the first connecting part 11 and the second connecting part 13 are set apart in the thickness direction of the connector 1 by the insulating member 3, thus avoiding a problem of short circuit between the first connecting part 11 and the second connecting part 13; moreover, the insulating member 3 plays a buffering role between the first connecting part 11 and the second connecting part 13, thereby enhancing a structural strength of the bendable connecting part 15, and avoiding a problem of folding or fracture of the bendable connecting part 15 after bending.

It should be noted that, for a clearer description, an X-axis direction is defined as a length direction of the energy storage device 100; a Y-axis direction is defined as a width direction of the energy storage device 100; and a Z-axis direction is defined as a height direction of the energy storage device 100. The length direction of the current collecting component 40 and the length direction of the connector 1 are directions parallel to the length direction of the energy storage device 100. The width direction of the current collecting component 40 and the width direction of the connector 1 are directions parallel to the width direction of the energy storage device 100. The height direction of the current collecting component 40 (i.e., the thickness direction of the current collecting component 40) and the height direction of the connector 1 are directions parallel to the height direction of the energy storage device 100. For example, an arrow direction of the Z-axis direction is upward, and a direction opposite to the arrow direction of the Z-axis direction is downward.

The first connecting part 11 includes a first soldering region 111; the second connecting part 13 includes a second soldering region 131. The first soldering region 111 and the second soldering region 131 are spaced apart in positive projection on the first connecting part 11, thereby further avoiding a risk of a short circuit caused by direct contact between the first connecting part 11 and the second connecting part 13. In some embodiments, the positive projections of the first soldering region 111 and the second soldering region 131 on the first connecting part 11 are located adjacent to each other or at least partially overlapped, thereby shortening the length of the connector 1 and further saving space, reducing weight, reducing the amount of material used for the electrically conductive connecting member, and saving cost.

The bendable connecting part 15 includes, but is not limited to, a C-shaped structure, a U-shaped structure, a V-shaped structure, or a wave-shaped structure, thereby ensuring that the first fusing part 151 and the second fusing part 152 can be bent smoothly, and improving a mass production yield of the product. For example, in this embodiment, the first fusing part 151 and the second fusing part 152 are constructed in a C-shaped structure, thereby reducing a local bending of the first fusing part 151 and the second fusing part 152, reducing bending fatigue, preventing the first fusing part 151 and the second fusing part 152 from breaking, and reducing the space occupied in the width direction of the connector 1 after the first fusing part 151 and the second fusing part 152 are bent.

Figure 6:
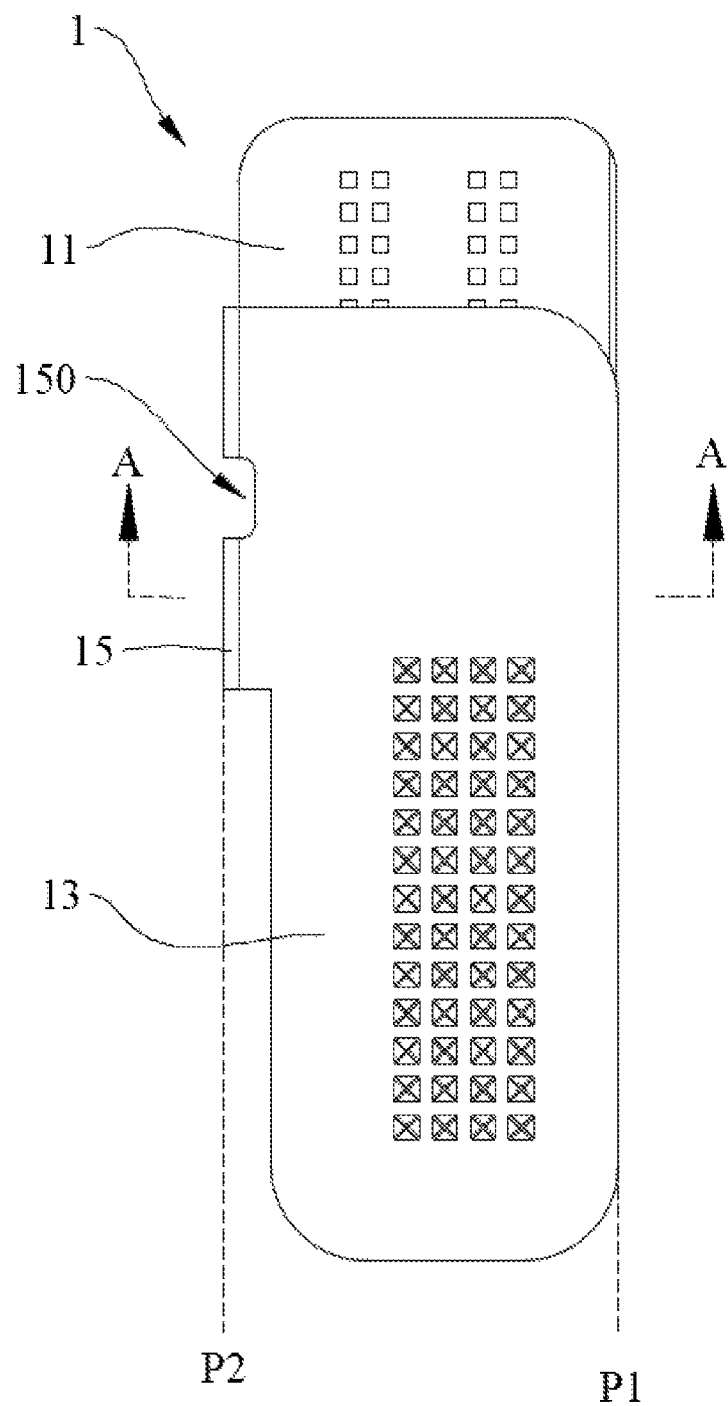
FIG. 6 is a top view of the connector of the current collecting component of FIG. 2.
Figure 7:
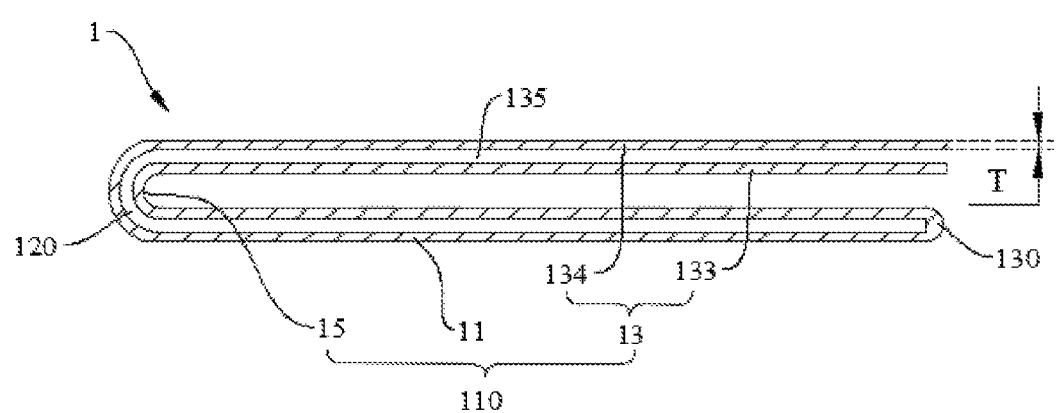
FIG. 7 is a cross-sectional view of the connector of the current collecting component of FIG. 6 taken along a line A-A.

Referring together to FIGS. 6 to 7, FIG. 6 is a top view of the connector 1 of the current collecting component 40 of FIG. 2; FIG. 7 is a cross-sectional view of the connector 1 of the current collecting component 40 of FIG. 6 taken along a line A-A. The connector 1 is folded along the first folding axis P1 to form two-layers of connector main bodies 110, and a gap 120 is formed between the two layers of the connector main bodies 110. Therefore, on one hand, a breakage of the connector 1 at the first folding axis P1 is avoided, and on the other hand, the gap 120 may serve as a channel for insertion of the tab 302, and may provide a stress release space for the connector main body 110 to be bent again, so as to improve the fracture resistance of the connector 1. Understandably, if the gap 120 is too large, it is unfavourable for the two layers of connector main bodies 110 to be folded, and if the gap 120 is too small, the connector 1 is prone to fracture when bending along the first folding axis P1 and is unfavourable for the tab 302 to be mounted and prone to damage the tab 302. Optionally, the gap 120 is substantially 0.3 mm to 3 mm, thereby ensuring smooth bending of the two layers of connector main bodies 110, as well as facilitating installation of the tab 302 and protecting the tab 302 from damage. For example, in some embodiments, the gap 120 is 0.3 mm, 0.5 mm, 0.7 mm, 1 mm, 1.5 mm, 2 mm, 2.5 mm, 3 mm, and so on. It should be noted that the sizes of the gap 120 are only for illustration and do not constitute a specific limitation, and the gap 120 needs to be designed according to an actual product design.

The connector 1 is formed with a curved structure 130 at the first folding axis P1, thereby further avoiding a problem of the connector 1 breaking at the first folding axis P1, as well as facilitating the bending process and improving an assembly efficiency of the tab 302. The connector 1 is folded 180 degrees along the first folding axis P1, thereby ensuring that the surface of the connector main body 110 is flat and in a stacked structure, thereby further ensuring that the two layers of the connector main bodies 110 are easier to bend, and the stress during bending can be absorbed and dispersed. The connector 1 is folded, which can save space and increase the overall thickness of the connector 1.

The two layers of connector main bodies 110 are folded along the second folding axis P2 to form the first connecting part 11, the second connecting part 13 and the bendable connecting part 15. The first folding axis P1 is parallel to the second folding axis P2. As a result, in a first aspect, the two layers of the connector main bodies 110 can be used as a thicker layer of anti-bending, which can improve the structural strength of the first fusing part 151 and second fusing part 152, and reduce the damage to wire due to excessive bending angle. In a second aspect, problems of bending abnormality, large space occupation and so on caused by the intersection of the first bending axis P1 and the second bending axis P2 are avoided, which facilitates the processing and reduces a production scrap rate. In a third aspect, the connector 1 as a whole is folded along the first folding axis P1 and is then bent along the second folding axis P2, which facilitates the bending process, standardizes the bending process and improves the processing accuracy; problems of bending abnormality, large space occupation and so on caused by the intersection of the first bending axis P1 and the second bending axis P2 are avoided, which facilitates the processing and reduces a production scrap rate. The two layers of connector main bodies 110 are folded 180 degrees along the second folding axis P2, thereby ensuring that the surfaces of the first connecting part 11 and the second connecting part 13 are flat, and facilitating to weld them with the poles 202 and the tabs 302 respectively, and improving the welding quality and saving space.

The first connecting part 11 of the current collecting component 40 is electrically connected to the pole 202, and the second connecting part 13 of the current collecting component 40 is electrically connected to the tab 302, thereby ensuring a connection area between the first connecting part 11 and the pole 202, and a connection area between the second connecting part 13 and the tab 302, improving a connection strength between the first connecting part 11 and the pole 202 and a connection strength between the second connecting part 13 and the tab 302, and preventing a separation of the first connection part 11 from the pole 202 and a separation of the second connection part 13 and the tab 302 in the course of the use of the energy storage device 100.

Specifically, the gap 120 has an insertion space 135 for insertion of the tab 302. The connector main body 110 of the second connecting part 13 includes a first connecting piece 133 and a second connecting piece 134. The insertion space 135 is formed between the first connecting piece 133 and second connecting piece 134, thereby achieving that the second connecting part 13 wraps around the tab 302 to prevent the tab 302 from being damaged and avoid a problem of false soldering or mis-soldering caused by displacement of the tab 302 during ultrasonic welding, and enhancing the stability of the tab 302. After the tab 302 is inserted into the insertion space 135 formed between the first connecting piece 133 and the second connecting piece 134, the tab 302 is electrically connected to the second connecting part 13 by welding, thereby improving the stability and reliability of the connection between the tab 302 and the second connecting part 13.

Understandably, punching is a stamping process that uses a die to separate one partial material from another partial material of a part. The connector 1 is generally formed by punching on a sheet material, i.e., the part consists of a punched portion to be punched off and a portion of connector 1 that is left behind after the punching. The connector 1 will form burrs on the edges of the connector 1 under the punching process. It should be noted that the burrs are orientated in the same direction as the punching direction of the connector 1. For example, in this embodiment, the punching direction of the connector 1 is substantially perpendicular to an extension plane where the part is located, i.e. the punched section of the part is perpendicular to the extension plane where the part is located. Optionally, the first connecting piece 133 is close to the first connecting part 11 relative to the second connecting piece 134, and the second connecting piece 134 is far away from the first connecting part 11 relative to the first connecting piece 133; a punching direction of the first connecting piece 133 is towards the first connecting part 11, and in the opposite direction to the punching direction of the second connecting piece 134, thereby avoiding a risk of burrs on the punched edge scratching the tab 302 and causing the tab 302 to rupture. Specifically, the punching direction of the first connecting part 133 faces upward, and the punching direction of the second connecting part 134 faces downward, so that the burrs of the edges of the first connecting part 133 and the burrs of the edges of the second connecting part 134 extend toward a side far away from the insertion space 135, thereby greatly reducing a risk of the burrs scratching the tab 302 and improving a production yield.

For example, in this embodiment, the connector 1 may include one piece of metal foil, thereby saving costs, reducing weight, and facilitating bending of the connector 1. In some other embodiments, the connector 1 may also include a plurality of pieces of metal foils. All the metal foils are stacked in layers and folded along the first folding axis P1 to form a two layers of connector main bodies 110. Therefore, when the connector 1 includes one sheet of metal foil, thereby achieving cost saving and weight reduction, as well as facilitating the bending of the connector 1; when the connector 1 includes a plurality sheets of metal foils, by configuring the connector 1 as a multi-layer stacked structure, the thickness of the stacked structure is increased in order to better absorb and disperse the stress during bending, thereby avoiding a problem of fracture of the connector 1 during bending, and all the metal foils are integrated into a one-piece structure, thereby ensuring that the tab 302 is protected from damage and can be smoothly inserted between the two layers of the connector main bodies 110. In addition, the inner-most metal foils can quickly disconnect the circuit between the first connecting part 11 and the second connecting part 13 when fusing occurs, and the insulating member 3 can further avoid the problem of the first connecting part 11 and the second connecting part 13 being easily lapped due to the creeping of the outermost metal foils. The metal foil may be, but is not limited to, an aluminium foil, a copper foil, and so on. The metal foil may have a thickness T of 0.02 mm to 0.4 mm, thereby enhancing the overall structural strength of the connector 1 and facilitating the bending process.

Figure 8:
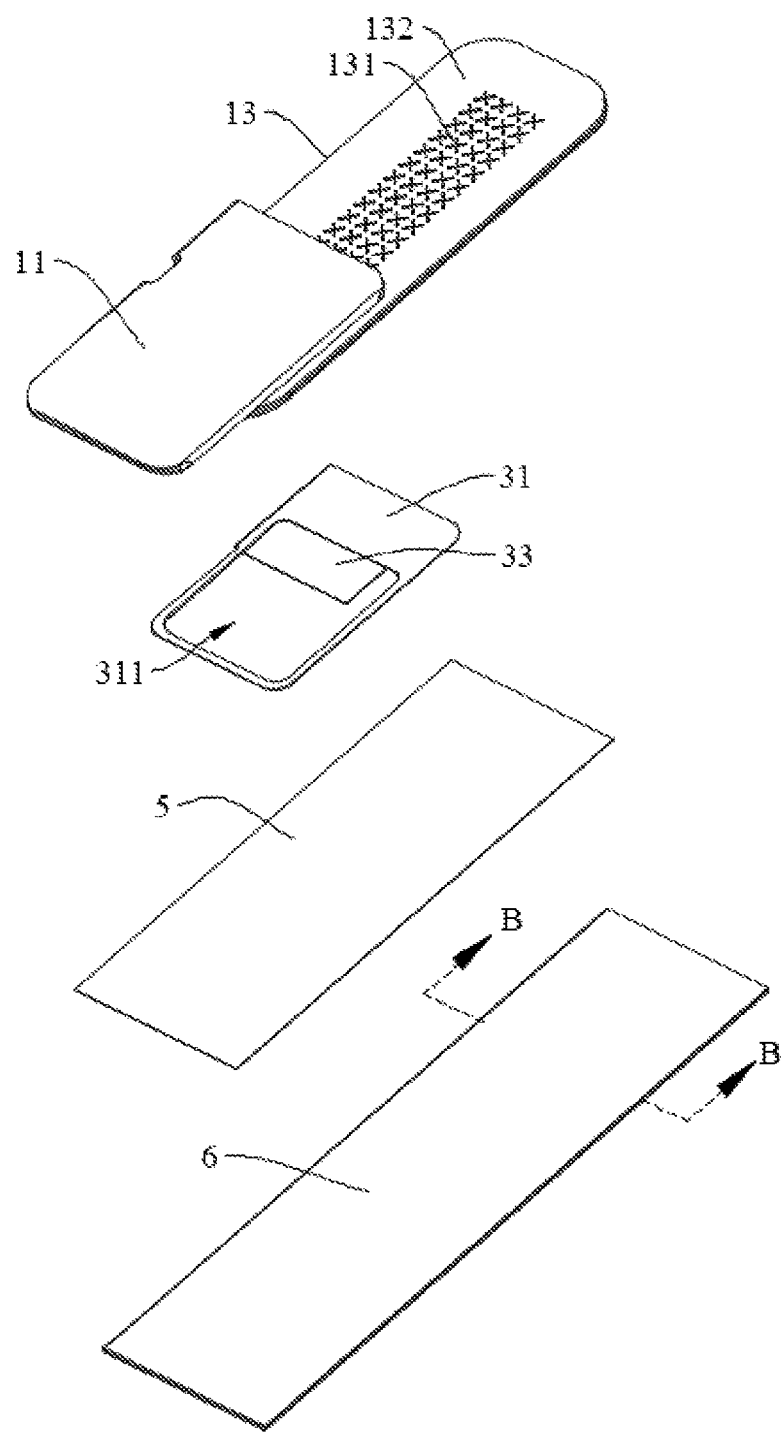
FIG. 8 is an exploded view of the current collecting component of the energy storage device of FIG. 4 in the second view.

Referring to FIGS. 2, 4, and 8 together, FIG. 8 is an exploded view of the current collecting component 40 of the energy storage device 100 of FIG. 4 in the second view. The insulating member 3 includes a limiting surface 310 for abutting against the bendable connecting part 15. The bendable connecting part 15 is turned over and bent around the limiting surface 310. It should be understood that, for example, in this embodiment, the connector 1 may be a positive electrode connector. The positive electrode connector is an aluminium foil sheet or an aluminium alloy foil sheet. Since the material of the aluminium foil sheet or the aluminium alloy foil sheet is soft, the positive electrode connector is prone to fracture after excessive bending. In some embodiments, the connector 1 may also be a negative electrode connector. The negative electrode connector is a copper foil or a copper alloy foil. The negative electrode connector is also prone to fracture after excessive bending. Accordingly, the current collecting component 40 provided in the present disclosure is based on the addition of the insulating member 3 between the first connecting part 11 and the second connecting part 13. In a first aspect, the insulating member 3 is able to buffer the bendable connecting part 15, so that the insulating member 3 is able to absorb and disperse the stress of the bendable connecting part 15 in the bending process, so as to improve the structural stress strength of the bendable connecting part 15 in the bending process, thus effectively avoiding a problem that the bendable connecting part 15 is subjected to too much stress and breaks, and prolonging the service life of the bendable connecting part 15. In a second aspect, the bendable connecting part 15 is turned over and bent around the limiting surface 310, so that the limiting surface 310 plays a role of guiding the bendable connecting part 15 to bend, and plays a supporting role for the bendable connecting part 15 in the bending process, so that the connector 1 is easier to be bent. In a third aspect, since the insulating member 3 is insulated from the connector 1, a problem of short circuit when the first connecting part 11 contacts the second connecting part 13 can be avoided. In a fourth aspect, the connector 1 is folded so that space can be saved.

Optionally, in some embodiments, the insulating member 3 includes a limiting surface 310 for abutting the first fusing part 11 and/or the second fusing part 13, the first fusing part 11 and/or the second fusing part 13 are turned over and bent around the limiting surface 310. As a result, the bendable connecting part 15 is turned over and bent around the limiting surface 310, so that the limiting surface 310 acts as a guide for the bendable connecting part 15 to be bent and supports the bendable connecting part 15 during the bending process, therefore, the connector 1 is easier to bend; also, the insulating member 3 can buffer the bendable connecting part 15, so that the insulating member 3 can absorb and disperse the stress of the bendable connecting part 15 in the bending process to improve the structural strength of the bendable connecting part 15 in the bending process, thereby effectively avoiding a problem of breakage of the bendable connecting part 15 due to excessive stress, and prolonging a service life of the bendable connecting part 15.

Optionally, in some embodiments, the limiting surface 310 is a curved surface, thereby avoiding a risk of scratching or hitting the connector 1 due to the irregular limiting surface 310; thereby avoiding a problem of difficult installation due to the irregular limiting surface 310, thus achieving a protection of the bendable connecting part 15. In some other embodiments, the shape of the limiting surface 310 may be, but is not limited to, wavy, polygonal, and so on, and the present disclosure does not make specific limitations.

For example, in this embodiment, the insulating member 3 includes a limiting body 31 and a movable flap 33 that is movably connected to the limiting body 31. The limiting body 31 is configured to abut against the first connecting part 11. The movable flap 33 is configured to abut against the second connecting part 15. A bending amplitude of the bendable flap 33 relative to the limiting body 31 is configured to limit a bending amplitude of the bendable connecting part 15, so as to avoid a phenomenon of breakage of the bendable connecting part 15 in the bending process, and to ensure that the connector 1 is easy to bend; also, the movable flap 33 can be turned over and connected to the limiting body 31, thereby avoiding a surface of the insulating member 3 from being depressed and deformed under pressure, making the insulating member 3 have a good resistance, and thus improving the buffering effect of the insulating member 3 on the bendable connecting part 15. In some embodiments, the insulating member 3 may include only the limiting body 31, i.e., the movable flap 33 may be omitted.

Optionally, in some embodiments, the first connecting part 11, the limiting body 31, the movable flap 33 and the second connecting part 13 are sequentially stacked in the thickness direction of the current collecting component 40, thereby making the overall structure of the current collecting component 40 have beneficial effects such as more compact, saving space, facilitating the mounting and dismounting of the insulating member 3, and so on.

In this embodiment, the limiting body 31 is integrally formed with the movable flap 33. The insulating member 3 is configured as a bendable structure. For example, the insulating member 3 is configured as a leaf spring that can be bent and unfolded. As a result, the connection strength between the limiting body 31 and the movable flap 33 is improved, the assembly efficiency between the insulating member 3 and the connector 1 is improved, and the processing production process of the insulating member 3 is facilitated; also, the movable flap 33 can weaken the squeezing force of the insulating member 3 by the bendable connecting part 15, to prevent the surface of the insulating member 3 from being depressed and deformed under pressure, so as to provide the insulating member 3 with a good resistance to pressure, thereby improving a cushioning effect of the insulating member 3 on the bendable connecting part 15. In some embodiments, the limiting body 31 and the movable flap 33 may also be rotationally connected together by a rotating shaft, a hinge, or so on, and the present disclosure is not specifically limited.

In some embodiments, the first connecting part 11 includes a first soldering region 111. A pole 202 on the cover plate 201 is assembled to the first soldering region 111 of the first connecting part 11 mainly by a welding method or a riveting method. The welding method includes but is limited to processes such as resistance spot welding, ultrasonic welding, laser welding, and so on. For example, in this embodiment, the first connecting part 11 and the pole 202 are assembled using a laser welding process. It should be noted that resistance spot welding, laser welding process and ultrasonic welding process are widely used in the field and will not be described in detail herein. Understandably, the connector 1 is prone to produce weld slag during the welding process, and the metal debris at the first soldering region 111 are prone to fall off from the first connecting part 11 during the movement process, and when the metal debris fall inside the energy storage device 100, it is easy to cause a short circuit within the energy storage device 100, affecting the performance and safety of the energy storage device 100.

Optionally, in some embodiments, the limiting body 31 defines a window 311 that exposes the first soldering region 111. The current collecting component 40 also includes a first insulating film 5. The first insulating film 5 is located at the window 31 and covers the window 311. Thus, the first insulating film 5 can block metal debris such as welding slag or rusty slag at the first connecting part 11 from falling into the interior of the energy storage device 100 and triggering a risk of short circuit, which helps to improve the yield rate and safety of the energy storage device 100. Also, the first insulating film 5 can further avoid a problem of short circuit when the first connecting part 11 contacts the second connecting part 13.

In some embodiments, the insulating member 3 covers at least a portion of the through hole 150. Thereby, after the first insulating film 5 and the second insulating film 6 are displaced, the insulating member 3 is still able to set the first connecting part 11 apart from the second connecting part 13, so as to prevent a contact short circuit; also, after the first fusing part 151 and the second fusing part 152 fuse, the insulating member 3 can be provided to avoid a problem of short circuit caused by the first connecting part 11 and the second connecting part 13 lapped again. Furthermore, metal debris such as welding slag and rusty slag can be prevented from entering the interior of the energy storage device 100 through the through hole 150, which may cause a safety hazard.

Figure 9:
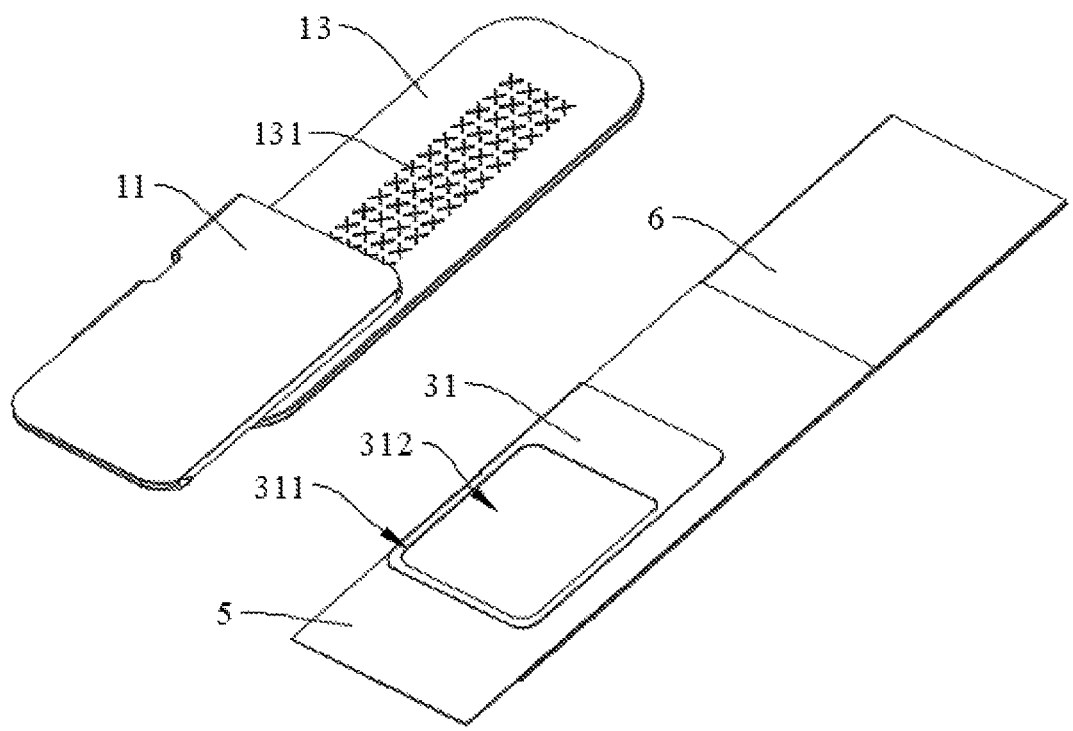
FIG. 9 is a partial exploded view of the current collecting component of the energy storage device of FIG. 2.

Referring together to FIGS. 4, 8, and 9, FIG. 9 is a partial exploded view of the current collecting component 40 of the energy storage device 100 of FIG. 2. In this embodiment, the window 311 is square, i.e., the limiting body 31 is formed with edge portions around the window 311 for pressing against the first insulating film 5, thereby increasing the contact area between the limiting body 31 and the first insulating film 5, i.e., increasing the friction between the limiting body 31 and the first insulating film 5, thereby reducing a risk of the first insulating film 5 falling off or shifting, and providing high safety and long service life. The sidewalls of the window 311 and the first insulating film 5 cooperatively form a receiving groove 312, and the receiving groove 312 is configured to receive metal debris such as welding slag and rusty slag, so as to avoid a phenomenon of scratching the second connecting part 13 during movement, and to ensure that metal debris such as welding slag and rusty slag do not overflow the first insulating film 5. This design saves the user's cost of use, the energy storage device 100 has a high specific energy, and the energy storage device 100 is compact and saves installation space.

In some embodiments, the window 311 may also be C-shaped, U-shaped, etc., and the shape of the window 311 may be designed according to the shape of the first soldering region 111, which is not specifically limited by the present disclosure. Optionally, in some embodiments, the corners of the limiting body 31 and the movable flap 33 of the insulating member 3 and the corners of the window 311 are set to be at rounded corners, so as to avoid the insulating member 3 from damaging the first insulating film 5.

For example, in some embodiments, the length of the first insulating film 5 is greater than the length of the first soldering region 111, and the width of the first insulating film 5 is greater than the width of the first soldering region 111, thereby ensuring that the first insulating film 5 is able to block debris such as welding slag, rusty slag and so on at the first soldering region 111. Specifically, the first connecting part 11 further includes a first non-soldering region 112 surrounding the first soldering region 111. Optionally, the first insulating film 5 covers both the first soldering region 111 and the first non-soldering region 112, so as to better achieve insulation protection between the first connecting part 11 and the second connecting part 13, as well as to ensure that the first insulating film 5 is still able to cover the first soldering part 11 after shifting a preset distance, to block debris such as welding slag, rusty slag and so on, so as to improve the safety performance of the energy storage device 100. The length of the first insulating film 5 is equal to the length of the first soldering region 111, and/or, the length of the first insulating film 5 is equal to the length of the first soldering region 111, thereby saving production costs. In some embodiments, the first insulating film 5 is also designed to cover only the first soldering region 111.

For example, the material of the first insulating film 5 includes, but is not limited to, polypropylene (PP), polyphenylene sulfide (PPS), polyethylene terephthalate (PET), polyimide (PI), polystyrene (PS), castpolypropylene (CPP), Polyethylene naphthalate two formic acid glycol ester (PEN), polyvinyl chloride (PVC), polyether ether ketone (PEEK), polyethersulfone resin (PES), polyphenylene sulfone resin (PPSM), polyethylene (PE), or a combination thereof. In some embodiments, the first insulating film 5 is a PET film. The PET film is a glossy plastic film with high quality physical properties, high stiffness, strength and ductility, puncture resistance, abrasion resistance, heat and ultra-low temperature resistance, excellent chemical resistance, abrasion resistance, sealing and fragrance retention. The first insulating film 5 can also be replaced by other materials such as PPS, PE, PVC and so on according to actual needs.

In this embodiment, the number of the first insulating films 5 can optionally be a single layer or a multilayer. As an example, the multilayer of the first insulating film 5 can be for example two, three, four or more layers. It should be noted that the number of the first insulating films 5 is used for illustrative purposes only and does not constitute a specific limitation. For example, the thickness of the first insulating film 5 is 0.05 mm to 0.5 mm. The thickness of the first insulating film 5 needs to be determined according to the actual product design. If the first insulating film 5 is too thin, it may be easily damaged, and if the first insulating film 5 is too thick, it may increase the weight of the energy storage device 100 and reduce the energy density of the energy storage device 100.

The first insulating film 5 is located between the limiting body 31 and the movable flap 33, thereby reducing a phenomenon of the first insulating film 5 shifting or detaching during movement of the energy storage device 100, as well as improving an assembly efficiency of the first insulating film 5. Optionally, in some embodiments, the limiting body 31 is fixed to the first connecting part 11 by the first insulating film 5. Specifically, the first insulating film 5 is adhesive, i.e., the limiting body 31 is bonded to the first connecting part 11 by the first insulating film 5 to enable the limiting body 31 to be clamped between the first insulating film 5 and the first connecting part 11. Thereby, the connection strength between the first insulating film 5 and the first connecting part 11 is improved to further reduce a phenomenon of the first insulating film 5 shifting or detaching during movement of the energy storage device 100; also, the position of the insulating member 3 is limited to ensure that the bendable connecting part 15 can turn over and bend around the limiting surface 310 of the insulating member 3, so as to improve the assembly efficiency of the limiting body 31.

In some embodiments, the first soldering region 111 is provided with a first insulating film 5, to provide insulation protection for the first soldering region 111 of the first connecting part 11, to avoid a safety accident such as an explosion of the product due to an internal short circuit hazard in a process of manufacturing the energy storage device 100 and a movement of the energy storage device 100. In other embodiments, the first insulating film 5 is attached to the first non-soldering region 112 of the first connecting part 11; or, the first insulating film 5 is attached to the first soldering region 111 and the first non-soldering region 111 of the first connecting part 11. Optionally, the first insulating film 5 may also be attached to a side surface of the limiting body 31 near the movable flap 33, thereby further enhancing the connection strength between the first insulating film 5, the insulating member 3 and the first connecting part 11, and reducing a phenomenon of displacement or detachment of the first insulating film 5 during movement of the energy storage device 100. In some other embodiments, the first insulating film 5 may be non-adhesive, i.e., the first insulating film 5 is clamped between the limiting body 31 and the movable flap 33, thereby simplifying the assembly efficiency and saving costs.

In some embodiments, the limiting body 31 is fixed to the first connecting part 11, thereby further improving the connection strength between the insulating member 3 and the connector 1 to better fix the relative position of the insulating member 3, and thereby avoiding a phenomena of the bendable connecting part 15 being bent abnormally and the first insulating film 5 being displaced or detached. For example, in this embodiment, the limiting body 31 and the first connecting part 11 can be fixedly connected together by glue, i.e., an adhesive layer is provided to be located between the limiting body 31 and the first connecting part 11, so that the adhesive layer can be further configured to buffer the stress of the bendable connecting part 15, improving the bending efficiency and success rate, as well as simplifying the overall structure of the current collecting component 40. In some other embodiments, the limiting body 31 and the first connecting part 11 may also be fixedly connected together by, but not limited to, heat fusion, binding, mechanical connection, laser welding, ultrasonic welding, and so on. In some embodiments, the limiting body 31 is fixed to the first connecting part 11 through the first insulating film 5. Thus, the connection strength between the first insulating film 5 and the first connecting part 11 is improved, so as to further reduce a phenomenon of the first insulating film 5 shifting or detaching during movement of the energy storage device 100; also, the position of the insulating member 3 is limited, to ensure that the bendable connecting part 15 can be turned over and bent around the limiting surface 310 of the insulating member 3, and to improve the assembly efficiency of the limiting body 31.

It can be understood that, for example, in this embodiment, the movable flap 33 is movably located relative to the second connecting part 13, thereby facilitating assembly and disassembly of the insulating member 3. In some other embodiments, the movable flap 33 may also be fixed to the second connecting part 13; alternatively, the limiting body 31 may also be movably located relative to the first connecting part 11. Optionally, at least one of the movable flap 33 and the limiting body 31 is fixed relative to the connector 1, thereby avoiding a problem of shifting of the insulating member 3 which affects the connector 1 for bending.

For example, in this embodiment, the current collecting component 40 further includes a second insulating film 6. The second insulating film 6 is located between the first insulating film 5 and the movable flap 33. Whereby, the second insulating film 6 can prevent metal debris such as weld slag, rusty slag and so on at the second connecting part 13 from falling into the interior of the energy storage device 100 and triggering a risk of short-circuit, which helps to improve yield rate and safety of the energy storage device 100; also, the second insulating film 6 can further avoid a problem of short circuit when the first connecting part 11 contacts the second connecting part 13.

Optionally, the second connecting part 13 includes a second soldering region 131. The movable flap 33 defines a notch 330 at a position corresponding to the second soldering region 131 to expose the second insulating film 6. As a result, the second insulating film 6 can cover all of the second soldering region 131, thereby further preventing metal debris such as welding slag, rusty slag and so on at the second connecting part 13 from falling into the interior of the energy storage device 100 and triggering a risk of short circuit, avoiding a risk of short circuit caused by metal debris such as weld slag, rusty slag and so on at the second connecting part 13 falling into the interior of the energy storage device 100, avoiding a problem of short circuit when the first connecting part 11 is in contact with the second connecting part 13, and improving yield rate and safety of energy storage device 100. The notch 330 is defined at one end of the movable flap 33 away from the limiting body 31, thereby ensuring the connection strength between the movable flap 33 and the limiting body 31, and avoiding a problem of breakage of the movable flap 33 in a process of turning over.

The second connecting part 13 further includes a second non-soldering region 132 surrounding the second soldering region 131. Optionally, the second insulating film 6 covers the second soldering region 131 and the second non-soldering region 132, so as to better achieve insulation protection between the first connecting part 11 and the second connecting part 13, as well as to ensure that the second insulating film 6 can still cover the second soldering region 13 after being shifted by a preset distance, so as to block slag such as welding slag, rusty slag and so on, and to improve the safety performance of the energy storage device 100. The length of the second insulating region 6 is equal to the length of the second insulating region 131, and/or, the width of the second insulating film 6 is equal to the width of the second soldering region 131, thereby saving production costs. In some embodiments, the second insulating film 6 is also designed to cover only the second soldering region 131.

Figure 10:
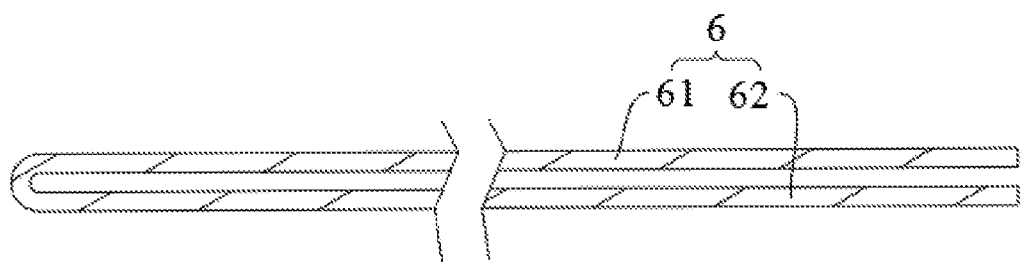
FIG. 10 is a cross-sectional view of a second insulating film of the current collecting component of FIG. 8 taken along a line B-B.

Referring together to FIG. 8 and FIG. 10, FIG. 10 is a cross-sectional view of a second insulating film 6 of the current collecting component 40 of FIG. 8 taken along a line B-B. In some embodiments, the second insulating film 6 includes a first membrane body 61 adhered to the first connecting film and a second membrane body 62 folded and connected to the first membrane body 61. The second membrane body 62 faces the second connecting part 13, thereby better securing the relative positions of the first insulating film 5 and the second insulating film 6.

Optionally, the first membrane body 61 may be fixed to the first insulating film 5 by an adhesive way. The second membrane body 62 may also be fixed to the movable flap 33 and/or the second connecting part 13 by an adhesive way, thereby further avoiding displacement of the first insulating film 5 and the second insulating film 6. In other embodiments, the second insulating film 6 may also be constructed as a single layer film. In other embodiments, the second insulating film 6 may be omitted, the first insulating film 5 covers both the second soldering region 131 and the first soldering region 111. The first insulating film 5 is constructed as a bilayer film, one layer of the first insulating film 5 covers the first soldering region 111, and the other layer of the first insulating film 5 covers the second soldering region 131.

Figure 11:
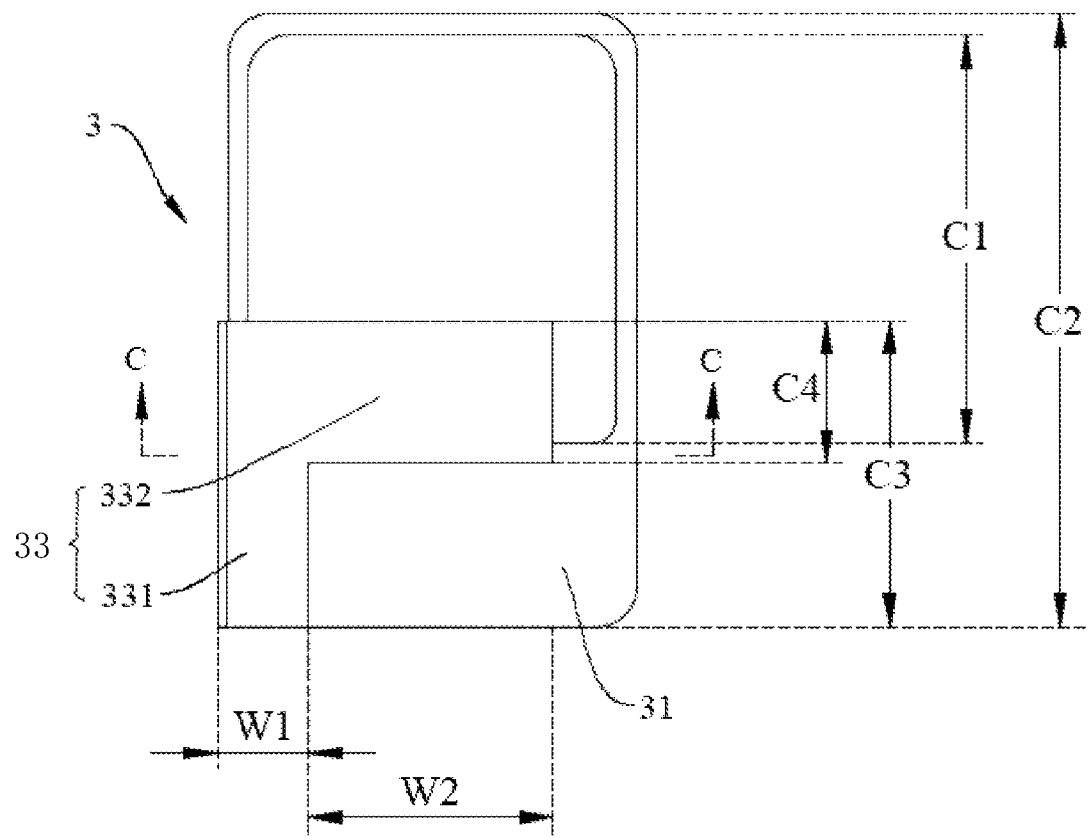
FIG. 11 is an enlarged view of an insulating member of the current collecting component of FIG. 4.
Figure 12:
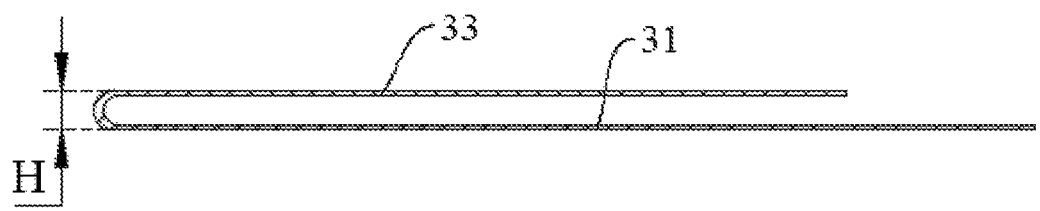
FIG. 12 is a cross-sectional view of the insulating member of the current collecting component of FIG. 11 taken along a line C-C.

Referring together to FIG. 11 and FIG. 12, FIG. 11 is an enlarged view of an insulating member 3 of the current collecting component 40 of FIG. 4; and FIG. 12 is a cross-sectional view of the insulating member 3 of the current collecting component 40 of FIG. 11 taken along a line C-C. In some embodiments, the thickness H of the insulating member 3 in the thickness direction of the current collecting component 40 is 1 mm to 3 mm, i.e., the overall thickness of the insulating member 3 is 0.03 mm to 5 mm. As a result, a phenomena of stress fatigue or even fracture of the bendable connecting part 15 of the connector 1 is avoided in the bending process, which improves a usage reliability of the connector 1; also, the space occupied by the insulating member 3 in the thickness direction of the current collecting component 40 is effectively reduced, effectively reducing the thickness of the current collecting component 40, and further adapting to the market demand for miniaturize of the current collecting component 40.

It can be understood that the radius of curvature of the bendable connecting part 15 increases with the increase of the thickness H of the insulating member 3 in the thickness direction of the current collecting component 40. If the thickness H of the insulating member 3 in the thickness direction of the current collecting component 40 is too small, the radius of curvature of the bendable connecting part 15 is small, which leads to a problem of breakage of the bendable connecting part 15 in the bending process. If the thickness H of the insulating member 3 in the thickness direction of the current collecting component 40 is too large, and the radius of curvature of the bendable connecting part 15 is large, thereby increasing the weight of the energy storage device 100, increasing the occupancy of the internal space of the energy storage device 100 by the insulating member 3, and reducing the energy density of the energy storage device 100. Optionally, the thickness H of the insulating member 3 in the thickness direction of the current collecting component 40 is 2 mm, so as to better balance the overall thickness of the insulating member 3 and the radius of curvature of the bendable connecting part 15. For example, in some embodiments, the thickness H of the insulating member 3 in the thickness direction of the current collecting component 40 is 0.3 mm, 0.05 mm, 0.07 mm, 1 mm, 1.5 mm, 2 mm, 2.5 mm, 3 mm, 3.5 mm, 4 mm, 4.5 mm, 5 mm, etc. It should be noted that the thickness H of the insulating member 3 are only for illustration and do not constitute a specific limitation, and the thickness H of the insulating member 3 needs to be designed according to the actual product design.

The ratio of the length C1 of the window 311 to the length C2 of the limiting body 31 is 0.2 to 0.5, so as to avoid that the insulating member 3 is displaced during a process of the transport vibration of the energy storage device 100, and thus appears to be misaligned with the first connecting part 11, thereby effectively shielding the weld slag of the first connecting part 11 and enhancing the safety of the energy storage device 100. The ratio of the length C1 of the window 311 to the length C2 of the limiting body 31 is 0.2, 0.25, 0.3, 0.35, 0.4, 0.45, 0.5, and so on. For example, in this embodiment, the length C1 of the window 311 is 8 mm, the length C2 of the limiting body 31 is 26 mm, and the ratio of the length C1 of the window 311 to the length C2 of the limiting body 31 is 0.3. It should be noted that the sizes of the length C1 of the window 311 and the length C2 of the limiting body 31 are merely for illustration and do not constitute a specific limitation, and the length C1 of the window 311 and the length C2 of the limiting body 31 need to be designed according to the actual product design.

For example, in this embodiment, the movable flap 33 may have an overall L-shaped structure. Specifically, the movable flap 33 includes a fixed part 331 connected to the limiting body 31 and an extending portion 332 connected to one side of the fixed part 331 away from the limiting body 31. The length C3 of the fixed part 331 is larger than the length C4 of the extending portion 332 to ensure the connection strength between the fixed part 331 and the limiting body 31. In some embodiments, the movable flap 33 may also be in a C-shaped structure or a U-shaped structure as a whole, so as to further increase the clamping area between the movable flap 33 and the second insulating film 6, and further reduce a phenomenon of the first insulating film 5 from shifting or detaching during movement of the energy storage device 100. In some embodiments, the corners of the notch 330 are round to avoid damage to the second insulating film 6 by the insulating member 3.

It should be understood that, in order to take into account the connection strength between the fixed part 331, the extending portion 332 and the limiting body 31, the gripping force of the insulating member 3, and the exposed area of the second insulating film 6 at the notch 330, the fixed part 331 has a width W1 of roughly 2 mm to 6 mm, and the extending portion 332 has a width W2 of 5 mm to 10 mm. For example, in some embodiments, the width W1 of the fixed part 331 is 2 mm, 3 mm, 4 mm, 5 mm, 6 mm, and so on, and the width W2 of the extending portion 332 is 5 mm, 6 mm, 7 mm, 8 mm, 9 mm, 10 mm, and so on. It should be noted that the sizes of the width W1 of the fixed part 331 and the width W2 of the extending portion 332 are only for illustration and do not constitute a specific limitation, and the width W1 of the fixed part 331 and the width W2 of the extending portion 332 need to be designed according to the actual product design.

It should be noted that the materials of the first insulating film 5 is applicable to the materials of the second insulating film 6, the specific details of which are described in the above embodiments and will not be repeated herein. The materials of the second insulating film 6 may be different from that of the first insulating film 5; or, it may also be the same as that of the first insulating film 5. Optionally, the colour of the first insulating film 5 is different from that of the second insulating film 6, so as to facilitate differentiation, improve the assembly efficiency and accuracy, and facilitate to determine whether the first insulating film 5 and the second insulating film 6 are missing, displaced, detached, or so on. For example, in this embodiment, the first insulating film 5 is a blue insulating film, and the second insulating film 6 is a green insulating film. In some embodiments, the first insulating film 5 and the second insulating film 6 may have same colour; alternatively, the first insulating film 5 and the second insulating film 6 are each of other colours, without specific limitation of the present disclosure.

Optionally, in some embodiments, at least one of the first connecting part 11 and the second connecting part 13 is provided with an anchoring member that anchors the first insulating film 5 and the second insulating film 6, thereby further avoiding a phenomena of the first insulating film 5 and the second insulating film 6 shifting or detaching. For example, the anchoring member may be constructed as a snap hook structure or a protruded structure provided on the first connecting part 11 and the second connecting part 13; the first insulating film 5 and the second insulating film 6 define a snap hole to which the snap hook structure or the protruded structure fits.

A positive projection of the notch 330 on the first insulating film 5 is spaced apart from a positive projection of the window 311 on the first insulating film 5, i.e., the extending portion 332 of the movable flap 33 is blocked from the limiting body 31. As a result, a risk of short circuit is avoided due to contact between the first connecting part 11 and the second connecting part 13; also, a risk of short circuit caused by welding slag, rusty debris and other debris passing through the window 311 and the notch 330 and coming into contact with the first connecting part 11 or the second connecting part 13 is avoided, and furthermore, a phenomenon that the first insulating film 5 and the second insulating film 6 are displaced due to the push of the movable flap 33 is avoided.

The insulating member 3 is located at a position corresponding to the bendable connecting part 15, so as to ensure that the bendable connecting part 15 can be bent smoothly, and to improve a mass production yield of the product. Optionally, the insulating member 3 is abutted against the bendable connecting part 15, thereby ensuring that the bendable connecting part 15 can be turned over and bent around the insulating member 3. In some embodiments, the insulating member 3 is spaced apart from the bendable connecting part 15 by a predetermined distance, such that the bendable connecting part 15 can provide deformation space. The predetermined distance can be substantially 1 mm to 3 mm to ensure that the bendable connecting part 15 is able to turn over and bend around the insulating member 3.

In some embodiments, the insulating member 3 is located in a region where the first connecting part 11 and the second connecting part 13 overlap, thereby ensuring that the first connecting part 11 and the second connecting part 13 are able to drive the insulating member 3 to press the first insulating film 5 and the second insulating film 6, thereby avoiding a problem of displacement of the first insulating film 5 and the second insulating film 6.

For example, in this embodiment, the insulating member 3 is a plastic structure. The plastic structure is, for example, but is not limited to, a PET sheet, a PE sheet, a PS sheet, or so on. As a result, on one hand, the insulating effect of the insulating member 3 is achieved; on the other hand, the cushioning effect of the insulating member 3 is improved; on another hand, the production cost is reduced; on another hand, the friction between the first insulating film 5 and the second insulating film 6 is increased, to prevent the first insulating film 5 and the second insulating film 6 from shifting. In some embodiments, the insulating member 3 may also be other structures having an insulating effect, such as, but not limited to, asbestos, mica and so on.

Optionally, the insulating member 3 is configured as a sheet-like structure, thereby facilitating the turning over and folding of the movable flap 33 relative to the limiting body 31, and reducing the space occupied by the insulating member 3 for the current collecting component 40, thereby saving production cost; and further ensuring that the movable flap 33 has a flat surface after folding relative to the limiting body 31, to better compress the first insulating film 5 and the second insulating film 6.

Figure 13:
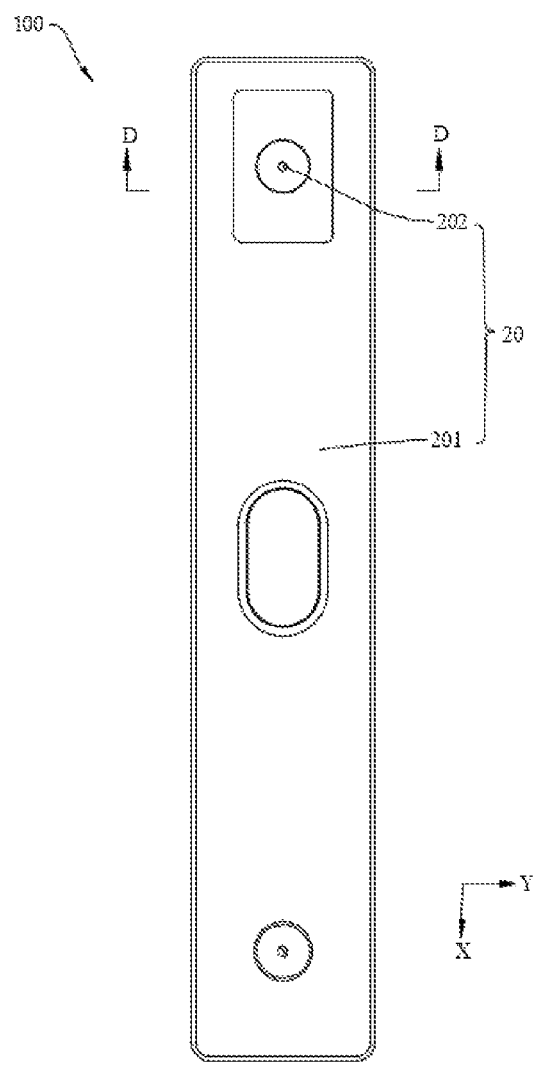
FIG. 13 is a top view of the energy storage device of FIG. 1.
Figure 14:
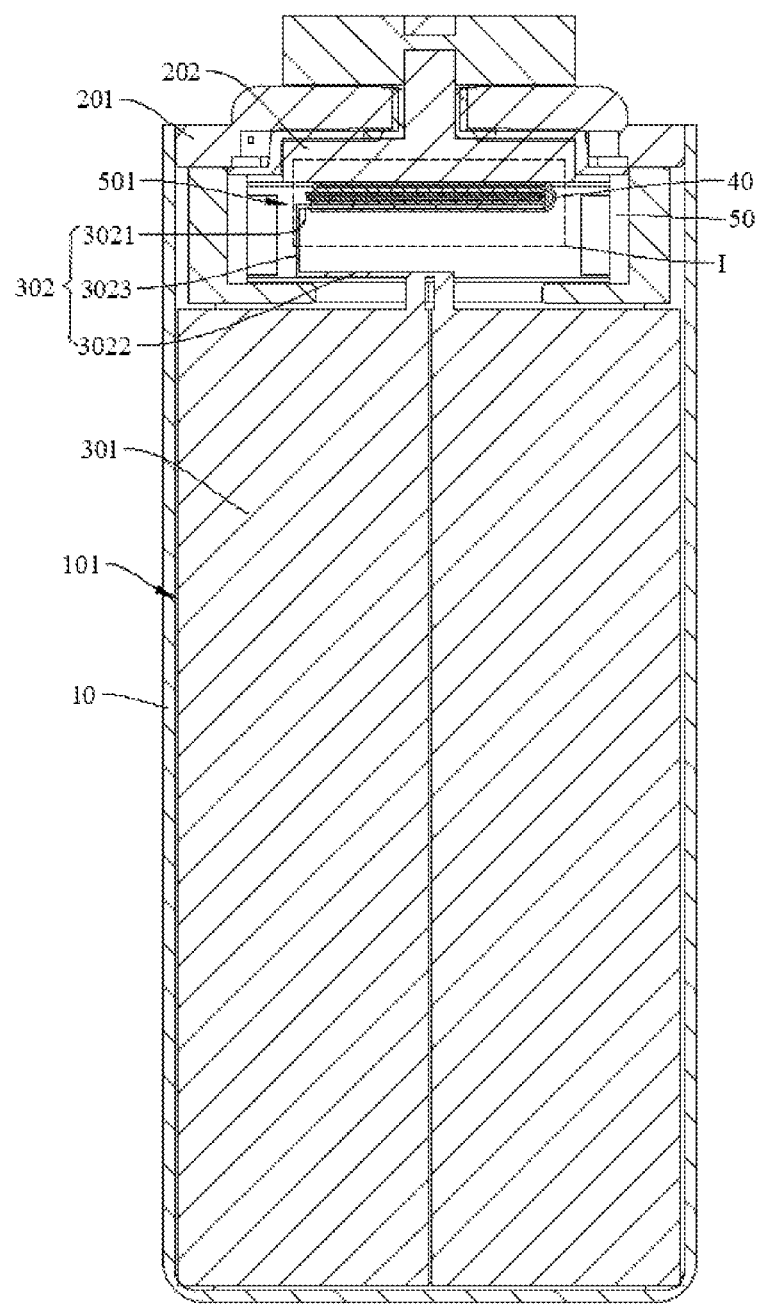
FIG. 14 is a cross-sectional view of the energy storage device of FIG. 13 taken along a line D-D.
Figure 15:
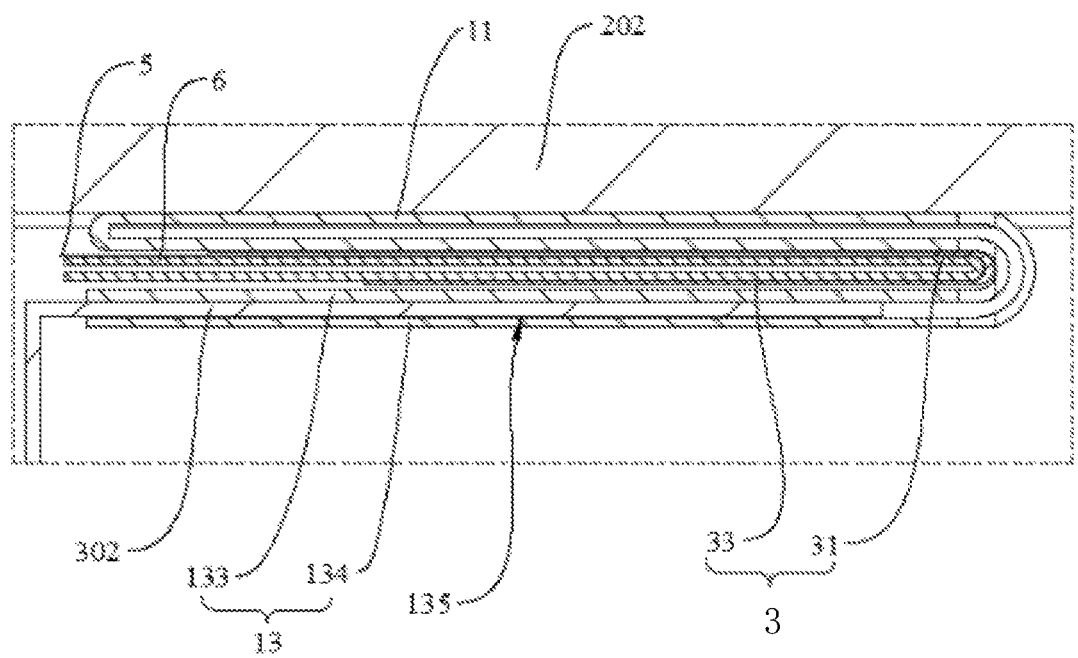
FIG. 15 is an enlarged view of a circle I of the energy storage device of FIG. 14.

Referring together to FIGS. 13 to 15, FIG. 13 is a top view of the energy storage device 100 of FIG. 1; FIG. 14 is a cross-sectional view of the energy storage device of FIG. 13 taken along a line D-D; and FIG. 15 is an enlarged view of a circle I of the energy storage device of FIG. 14. After first connecting part 11 is turned over and folded relative to the second connecting part 13, the first connecting part 11, the limiting body 31, the first insulating film 5, the second insulating film 6, the movable flap 33, and the second connecting part 13 are stacked in the thickness direction of the current collecting component 40, thereby effectively reducing the thickness of the connector 1 and further adapting to the market demand for the miniaturize of the connector 1.

The first connecting part 11 is turned over and folded relative to the second connecting part 13 to drive the movable flap 33 to be turned over and bent relative to the limiting body 31, to make the first insulating film 5 and the second insulating film 6 press against between the limiting body 31 and the movable flap 33, to avoid displacement of the first insulating film 5 and the second insulating film 6; also, to increase the thickness of the insulating member 3 in the thickness direction of the current collecting component 40 after the movable flap 33 being turned over and bent relative to the limiting body 31, so as to better absorb and disperse the stress during bending, thereby avoiding a fracture of the connector 1 in the bending process.

The tab 302 extends into the limiting groove 501 of the lower plastic member 50 and is accommodated in the insertion space 135 formed between the first connecting piece 133 and the second connecting piece 134, thereby enabling the first connecting piece 133 and the second connecting piece 134 to clamp the tab 302. Specifically, the tab 302 includes a first connecting segment 3021 connected to the battery cell 301, a second connecting segment 3022 connected to the second connecting part 13, and a third connecting segment 3023 connected to the first connecting segment 3021 and the second connecting segment 3022. The first connecting segment 3021 and the second connecting segment 3022 are spaced apart and are both oriented with respect to same direction of the third connecting segment 3023, so as to improve a bending degree of the tab 302, effectively save the internal space of the energy storage device 100, and at the same time avoid contact between the tab 302 and the connector 1 during bending, prevent a short circuit within the energy storage device 100, and increase an energy density of the energy storage device 100.

The above embodiments of the present disclosure are described in detail, this paper applies a specific example of the principle and implementation of the present disclosure is described, the above description of the embodiments is only used to help understand the application of the method and its core ideas; at the same time, for ordinary skill in the art, based on the ideas of the present disclosure, in the implementation of the application of the specific implementation of the application scope of the application will have to change the place, to summarize the above, the contents of the specification should not be construed as a limitation of the present disclosure.

What is claimed is:

1. A current collecting component, wherein the current collecting component comprises a connector and an insulating member; the connector comprises a first connecting part, a second connecting part and a bendable connecting part connecting the first connecting part and the second connecting part; the first connecting part is located opposite to the second connecting part; the insulating member is located between the first connecting part and the second connecting part which can be bent relative to each other; the insulating member comprises a limiting body and a movable flap which is movably connected with the limiting body; the limiting body is used for abutting against the first connecting part, and the movable flap is used for abutting against the second connecting part; the bendable connecting part defines a through hole to form a first fusing part and a second fusing part both connecting the first connecting part and the second connecting part and located on two opposite sides of the through hole; in a case that the connector is in an unfolded state, the through hole has a first straight line segment, a first corner segment, a second corner segment and a second straight line segment; the first straight line segment is connected to the first corner segment and adjacent to the first fusing part, the second straight line segment is connected to the second corner segment and adjacent to the second fusing part; and the first corner segment and the second corner segment are both set as rounded corners;

wherein a distance between the first straight line segment and one side of the first fusing part away from the first straight line segment is a first distance; wherein a distance between one end of the first corner segment away from the first straight line segment and the side of the first fusing part away from the first corner segment is a second distance; and the first distance is less than the second distance;

wherein a distance between the second straight line segment and one side of the second fusing part away from the second straight line segment is a third distance; a distance between one end of the second corner segment away from the second straight line segment and the side of the second fusing part away from the second corner segment is a fourth distance; and the third distance is less than the fourth distance;

wherein the number of the first corner segments and the second corner segments each is two, the two first corner segments are connected to opposite ends of the first straight line segment, and the two second corner segments are connected to opposite ends of the second straight line segment; the through hole further comprises a third straight line segment connected to one first corner segment and one second corner segment, and a fourth straight line segment connected to the other first corner segment and the other second corner segment; and the first straight line segment, the two first corner segments, the two second corner segments, the second straight line segment, the third straight line segment, and the fourth straight line segment cooperatively form the through hole; and wherein lengths of the first straight line segment and the second straight line segment are equal and are first length, a distance between the third straight line segment and the fourth straight line segment is a fifth distance, and a ratio of the first length to the fifth distance is 3/7 to 9/10, such that fusing positions of the first fusing part and the second fusing part coincide with a mechanical fatigue region of the bendable connecting part.

2. The current collecting component according to claim 1, wherein a fusing direction of the first fusing part and a fusing direction of the second fusing part are both perpendicular to a bending direction of the bendable connecting part.

3. The current collecting component according to claim 1, wherein a ratio of the first distance to the second distance is 0.7 to 0.95; and a ratio of the third distance to the fourth distance is 0.7 to 0.95.

4. The current collecting component according to claim 1, wherein lengths of the third straight line segment and the fourth straight line segment are equal and are second length, a distance between the first straight line segment and the second straight line segment is a sixth distance, and a ratio of the second length to the sixth distance is 0.4 to 0.9.

5. The current collecting component according to claim 4, wherein a distance between the side of the first fusing part away from the first straight line segment and the side of the second fusing part away from the second straight line segment is a seventh distance, and a ratio of the sixth distance to the seventh distance is 0.15 to 0.25.

6. The current collecting component according to claim 1, wherein the first connecting part, the insulating member and the second connecting part are stacked in a thickness direction of the current collecting component.

7. The current collecting component according to claim 1, wherein the first connecting part comprises a first soldering region, the second connecting part comprises a second soldering region, and the first soldering region and the second soldering region are spaced apart in a positive projection on the first connecting part.

8. The current collecting component according to claim 1, wherein the bendable connecting part comprises a C-shaped structure, a U-shaped structure, a V-shaped structure, or a wave-shaped structure.

9. The current collecting component according to claim 1, wherein the connector is folded along a first folding axis to form two layers of connector main bodies, a gap is formed between the two layers of the connector main bodies, the two layers of the connector main bodies are folded along a second folding axis to form the first connecting part, the second connecting part, and the bendable connecting part; and the first folding axis is parallel to the second folding axis.

10. The current collecting component according to claim 9, wherein the connector is formed with a curved structure at the first folding axis.

11. The current collecting component according to claim 9, wherein the gap is used as an insertion space for insertion of a tab; the connector main body of the second connecting part comprises a first connecting piece and a second connecting piece; and the insertion space is formed between the first connecting piece and the second connecting piece.

12. The current collecting component according to claim 11, wherein the first connecting piece is close to the first connecting part relative to the second connecting piece, the second connecting piece is far away from the first connecting part relative to the first connecting piece; and a punching direction of the first connecting piece faces towards the first connecting part, and the punching direction of the first connecting piece is in an opposite direction to a punching direction of the second connecting piece.

13. The current collecting component according to claim 9, wherein the connector comprises one or more metal foils, all of which are in a stack and folded along the first folding axis to form the two layers of the connector main bodies.

14. The current collecting component according to claim 1, wherein the insulating member comprises a limiting surface for abutting the first fusing part and/or the second fusing part; the first fusing part and/or the second fusing part are turned over and bent around the limiting surface.

15. The current collecting component according to claim 1, wherein the limiting body is fixed to the first connecting part.

16. The current collecting component according to claim 1, wherein the first connecting part comprises a first soldering region; the limiting body defines a window that exposes the first soldering region; the current collecting component further comprises a first insulating film; and the first insulating film is located at the window and covers the window.

17. The current collecting component according to claim 16, wherein the current collecting component further comprises a second insulating film which is located between the first insulating film and the movable flap.

18. The current collecting component according to claim 17, wherein the second connecting part comprises a second soldering region, and the movable flap defines a notch at a position corresponding to the second soldering region to expose the second insulating film.

19. An energy storage device, wherein the energy storage device comprises a tab, a pole and a current collecting component;
wherein the current collecting component comprises a connector and an insulating member; the connector comprises a first connecting part, a second connecting part and a bendable connecting part connecting the first connecting part and the second connecting part; the first connecting part is located opposite to the second connecting part; the insulating member is located between the first connecting part and the second connecting part which can be bent relative to each other; the insulating member comprises a limiting body and a movable flap which is movably connected with the limiting body; the limiting body is used for abutting against the first connecting part, and the movable flap is used for abutting against the second connecting part; the bendable connecting part defines a through hole to form a first fusing part and a second fusing part both connecting the first connecting part and the second connecting part and located on two opposite sides of the through hole; in a case that the connector is in an unfolded state, the through hole has a first straight line segment, a first corner segment, a second corner segment and a second straight line segment; the first straight line segment is connected to the first corner segment and adjacent to the first fusing part, the second straight line segment is connected to the second corner segment and adjacent to the second fusing part; and the first corner segment and the second corner segment are both set as rounded corners;
wherein a distance between the first straight line segment and one side of the first fusing part away from the first straight line segment is a first distance; wherein a distance between one end of the first corner segment away from the first straight line segment and the side of the first fusing part away from the first corner segment is a second distance; and the first distance is less than the second distance;
wherein a distance between the second straight line segment and one side of the second fusing part away from the second straight line segment is a third distance; a distance between one end of the second corner segment away from the second straight line segment and the side of the second fusing part away from the second corner segment is a fourth distance; and the third distance is less than the fourth distance;
wherein the first connecting part of the current collecting component is electrically connected to the pole; and the second connecting part of the current collecting component is electrically connected to the tab;
wherein the number of the first corner segments and the second corner segments each is two, the two first corner segments are connected to opposite ends of the first straight line segment, and the two second corner segments are connected to opposite ends of the second straight line segment; the through hole further comprises a third straight line segment connected to one first corner segment and one second corner segment, and a fourth straight line segment connected to the other first corner segment and the other second corner segment; and the first straight line segment, the two first corner segments, the two second corner segments, the second straight line segment, the third straight line segment, and the fourth straight line segment cooperatively form the through hole; and
wherein lengths of the first straight line segment and the second straight line segment are equal and are first length, a distance between the third straight line segment and the fourth straight line segment is a fifth distance, and a ratio of the first length to the fifth distance is 3/7 to 9/10, such that fusing positions of the first fusing part and the second fusing part coincide with a mechanical fatigue region of the bendable connecting part.

20. A power consuming device, wherein the power consuming device comprises an energy storage device, the energy storage device is configured to provide power to the power consuming device;
wherein the energy storage device comprises a tab, a pole and a current collecting component;
wherein the current collecting component comprises a connector and an insulating member; the connector comprises a first connecting part, a second connecting part and a bendable connecting part connecting the first connecting part and the second connecting part; the first connecting part is located opposite to the second connecting part; the insulating member is located between the first connecting part and the second connecting part which can be bent relative to each other; the insulating member comprises a limiting body and a movable flap which is movably connected with the limiting body; the limiting body is used for abutting against the first connecting part, and the movable flap is used for abutting against the second connecting part; the bendable connecting part defines a through hole to form a first fusing part and a second fusing part both connecting the first connecting part and the second connecting part and located on two opposite sides of the through hole; in a case that the connector is in an unfolded state, the through hole has a first straight line segment, a first corner segment, a second corner segment and a second straight line segment; the first straight line segment is connected to the first corner segment and adjacent to the first fusing part, the second straight line segment is connected to the second corner segment and adjacent to the second fusing part; and the first corner segment and the second corner segment are both set as rounded corners;
wherein a distance between the first straight line segment and one side of the first fusing part away from the first straight line segment is a first distance; wherein a distance between one end of the first corner segment away from the first straight line segment and the side of the first fusing part away from the first corner segment is a second distance; and the first distance is less than the second distance;
wherein a distance between the second straight line segment and one side of the second fusing part away from the second straight line segment is a third distance; a distance between one end of the second corner segment away from the second straight line segment and the side of the second fusing part away from the second corner segment is a fourth distance; and the third distance is less than the fourth distance;

wherein the first connecting part of the current collecting component is electrically connected to the pole; and the second connecting part of the current collecting component is electrically connected to the tab;

wherein the number of the first corner segments and the second corner segments each is two, the two first corner segments are connected to opposite ends of the first straight line segment, and the two second corner segments are connected to opposite ends of the second straight line segment; the through hole further comprises a third straight line segment connected to one first corner segment and one second corner segment, and a fourth straight line segment connected to the other first corner segment and the other second corner segment; and the first straight line segment, the two first corner segments, the two second corner segments, the second straight line segment, the third straight line segment, and the fourth straight line segment cooperatively form the through hole; and wherein lengths of the first straight line segment and the second straight line segment are equal and are first length, a distance between the third straight line segment and the fourth straight line segment is a fifth distance, and a ratio of the first length to the fifth distance is 3/7 to 9/10, such that fusing positions of the first fusing part and the second fusing part coincide with a mechanical fatigue region of the bendable connecting part.

* * * * *